United States Patent
Vautrin et al.

(10) Patent No.: US 11,758,317 B1
(45) Date of Patent: *Sep. 12, 2023

(54) SYSTEMS AND METHODS FOR CONTROLLING PLAYBACK AND OTHER FEATURES OF A WIRELESS HEADPHONE

(71) Applicant: Sonos, Inc., Santa Barbara, CA (US)

(72) Inventors: Jodi Vautrin, Boston, MA (US); Aki Laine, Santa Barbara, CA (US); Dana Krieger, Santa Barbara, CA (US); Philippe Vossel, Wuppertal (DE); Vincent Shyu, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,046

(22) Filed: Aug. 21, 2020

Related U.S. Application Data

(63) Continuation of application No. 16/583,094, filed on Sep. 25, 2019, now Pat. No. 10,757,499.

(51) Int. Cl.
  *H04R 1/10* (2006.01)
  *G06F 3/16* (2006.01)
  *G10L 15/22* (2006.01)
  *G10L 15/08* (2006.01)

(52) U.S. Cl.
  CPC .......... *H04R 1/1041* (2013.01); *G06F 3/165* (2013.01); *G06F 3/167* (2013.01); *G10L 15/08* (2013.01); *G10L 15/22* (2013.01); *H04R 1/1008* (2013.01); *G10L 2015/088* (2013.01); *G10L 2015/223* (2013.01); *H04R 2420/07* (2013.01)

(58) Field of Classification Search
  CPC .... H04R 1/1041; H04R 2420/07; H04R 1/02; H04R 1/028; H04R 1/1091;

(Continued)

(56) References Cited

U.S. PATENT DOCUMENTS 1,615,028 A 1/1927 Morser
1,648,832 A 11/1927 Urban
(Continued)

FOREIGN PATENT DOCUMENTS

CN 306928266 S 11/2021
EM 008313035-0001 12/2020
(Continued)

OTHER PUBLICATIONS

Ali, "B&O Beoplay H8i review", techradar, Apr. 23, 2018, retrieved from https://www.techradar.com/reviews/bando-beoplay-h8i on Aug. 20, 2020, 21 pgs.

(Continued)

*Primary Examiner* — Lun-See Lao
(74) *Attorney, Agent, or Firm* — KPPB LLP

(57) ABSTRACT

Wireless headphones with user controls and methods for using are disclosed. In one embodiment, a wireless headphone includes a left earcup comprising a left speaker driver and a left earcup housing; and a right earcup comprising a right speaker driver and a right earcup housing; a processor; a microphone; user controls including: a voice assistant activator control; a volume slider; a play control slider; a play-pause control; and instructions configuring the processor to: commence a voice assistant recognition routine when sound received by the microphone matches a wake word, and perform an action based on instructions returned from the voice assistant; update a current volume of the headphone to a higher volume when the volume slider receives a swipe; skip to a next track of a current media content when the play control slider receives a swipe; and toggle playback of the media content when the play-pause control is activated.

20 Claims, 27 Drawing Sheets

(58) Field of Classification Search
CPC ........ H04R 2201/103; H04R 2201/107; H04R 2225/55; H04R 25/554; H04R 3/00; H04R 5/033; H04R 5/04; H04R 1/1008; H04R 1/1083; H04R 2227/005; H04R 2430/01; H04H 20/95; H04L 61/6068; H04L 65/4069; H04L 65/4084; H04L 12/28; H04L 65/604; H04L 67/02; H04L 67/42; H04M 1/0254; H04M 1/67; H04M 1/72403; H04W 48/20; H04W 4/80; H04W 84/12; H04W 84/18; G10L 13/00; G10L 13/04; G10L 13/08; G10L 15/08; G10L 15/16; G10L 15/22; G10L 2015/088; G10L 2015/223; G10L 21/0272; G10L 21/06; G10L 25/18; G10L 25/30; G10L 25/81; H04N 7/181; H04N 21/252; H04N 21/25891; H04N 21/47214; H04N 21/4725; H04N 21/4755; H04N 21/47815; H04N 21/4788; H04N 21/4825; H04N 21/4826; H04N 21/4828; H04N 21/00; H04N 21/6125; H04N 21/422; H04N 21/4325
USPC .......................................................... 381/74
See application file for complete search history.

(56) References Cited

U.S. PATENT DOCUMENTS

| | | | |
|---|---|---|---|
| 2,420,245 A | 5/1947 | Hurst | |
| 2,782,423 A | 2/1957 | Simon et al. | |
| 2,862,671 A | 12/1958 | Dimond | |
| 3,051,961 A | 9/1962 | Clark | |
| 3,220,505 A | 11/1965 | Hargrave | |
| 3,454,964 A | 7/1969 | Brinkhoff | |
| 3,596,733 A | 8/1971 | Bertagni | |
| D235,210 S | 5/1975 | Hill | |
| D254,616 S | 4/1980 | Tabata | |
| 4,385,209 A | 5/1983 | Greason et al. | |
| 4,465,159 A | 8/1984 | Stallings | |
| D276,855 S | 12/1984 | Falco | |
| D313,092 S | 12/1990 | Nilsson | |
| 5,018,599 A | 5/1991 | Dohi et al. | |
| 5,035,005 A | 7/1991 | Hung | |
| D328,074 S | 7/1992 | Yamazaki et al. | |
| 5,144,678 A | 9/1992 | Lenz | |
| 5,293,647 A | 3/1994 | Mirmilshteyn et al. | |
| 5,384,857 A | 1/1995 | Nordin et al. | |
| 5,500,958 A | 3/1996 | Falco | |
| 5,640,458 A | 6/1997 | Nishiguchi et al. | |
| D385,665 S | 10/1997 | Westerdal | |
| 5,996,123 A | 12/1999 | Leight et al. | |
| D431,550 S | 10/2000 | Yoneda | |
| 6,236,969 B1 | 5/2001 | Ruppert et al. | |
| 6,449,806 B1 | 9/2002 | Engelhard et al. | |
| D505,411 S | 5/2005 | Sakai | |
| 6,993,143 B2 | 1/2006 | Harris et al. | |
| D538,261 S | 3/2007 | Taylor et al. | |
| D573,581 S | 7/2008 | Gondo et al. | |
| D582,890 S | 12/2008 | Koza et al. | |
| D603,370 S | 11/2009 | Suzuki | |
| D625,705 S | 10/2010 | Ohori et al. | |
| D633,895 S | 3/2011 | Morimoto | |
| D635,959 S | 4/2011 | Hutchieson | |
| D637,497 S | 5/2011 | Lee | |
| 8,006,320 B1 | 8/2011 | Rohbani | |
| 8,098,872 B2 | 1/2012 | Chang | |
| D657,344 S | 4/2012 | Brunner et al. | |
| D657,345 S | 4/2012 | Brunner et al. | |
| D668,633 S | 10/2012 | Enquist | |
| 8,295,529 B2 | 10/2012 | Petersen et al. | |
| D678,859 S | 3/2013 | Lee | |
| D683,329 S | 5/2013 | Hagelin | |
| D684,141 S | 6/2013 | Takamoto | |
| D688,649 S | 8/2013 | Combs et al. | |
| D691,583 S | 10/2013 | Kitayama | |
| D699,702 S | 2/2014 | Chen | |
| 8,755,555 B2 | 6/2014 | Dougherty et al. | |
| D708,163 S | 7/2014 | Ishikura | |
| 8,767,996 B1 | 7/2014 | Lin et al. | |
| 8,774,442 B2 | 7/2014 | Huang | |
| 8,818,011 B2 | 8/2014 | Chen | |
| D733,090 S | 6/2015 | Petersen | |
| D739,842 S | 9/2015 | Birger | |
| D750,041 S | 2/2016 | Birger | |
| 9,344,794 B1 | 5/2016 | Blonder | |
| D763,226 S | 8/2016 | Petersen | |
| D787,470 S | 5/2017 | Kelly et al. | |
| D800,691 S | 10/2017 | Ando et al. | |
| D813,837 S | 3/2018 | Paterson | |
| 10,027,299 B2 * | 7/2018 | Rose | G06F 3/165 |
| D826,894 S | 8/2018 | Zhang | |
| D830,222 S | 10/2018 | Silvestri | |
| D830,333 S | 10/2018 | Carr | |
| D830,334 S | 10/2018 | Carr | |
| D833,071 S | 11/2018 | Pennington et al. | |
| D837,763 S | 1/2019 | Suzuki | |
| D838,687 S | 1/2019 | Wu | |
| D840,971 S | 2/2019 | Summerson et al. | |
| D842,270 S | 3/2019 | Chen | |
| D851,839 S | 6/2019 | Scanlon | |
| D857,652 S | 8/2019 | Wang | |
| D858,481 S | 9/2019 | Saule et al. | |
| D859,353 S | 9/2019 | Wagner | |
| D860,163 S | 9/2019 | Xia | |
| 10,405,081 B2 | 9/2019 | Hviid et al. | |
| D861,636 S | 10/2019 | Carr | |
| 10,484,793 B1 * | 11/2019 | Peterson | H04R 3/12 |
| D871,368 S | 12/2019 | Saule et al. | |
| D872,049 S | 1/2020 | Saule et al. | |
| D876,388 S | 2/2020 | Carr et al. | |
| D877,714 S | 3/2020 | Dhondt et al. | |
| D878,327 S | 3/2020 | Dhondt et al. | |
| 10,694,309 B1 | 6/2020 | Vautrin et al. | |
| D890,123 S | 7/2020 | Yoshimura | |
| 10,757,499 B1 * | 8/2020 | Vautrin | G10L 15/22 |
| D900,782 S | 11/2020 | Vaclavik et al. | |
| D902,496 S | 11/2020 | Bui | |
| D905,005 S | 12/2020 | Liu | |
| D913,990 S | 3/2021 | Saule et al. | |
| D918,171 S | 5/2021 | Nakayama et al. | |
| D920,283 S | 5/2021 | Levine et al. | |
| D928,114 S | 8/2021 | Terazaki | |
| D934,198 S | 10/2021 | Michaelian et al. | |
| 11,153,678 B1 * | 10/2021 | Jorgovanovic | H04W 76/14 |
| D938,934 S | 12/2021 | Tsubone et al. | |
| D944,759 S | 3/2022 | Vaclavik | |
| D954,019 S | 6/2022 | Shyu et al. | |
| D961,545 S | 8/2022 | Ahovi et al. | |
| D974,327 S | 1/2023 | Shyu et al. | |
| D985,529 S | 5/2023 | Wagner | |
| D986,215 S | 5/2023 | Jörgensen | |
| 2002/0159833 A1 | 10/2002 | Nabeshima | |
| 2006/0027245 A1 | 2/2006 | Spector | |
| 2009/0041285 A1 | 2/2009 | Parkins et al. | |
| 2010/0180754 A1 | 7/2010 | Brown et al. | |
| 2013/0034259 A1 | 2/2013 | Xiong et al. | |
| 2014/0111415 A1 * | 4/2014 | Gargi | G06F 3/04883 345/156 |
| 2014/0363016 A1 | 12/2014 | Blonder | |
| 2015/0222977 A1 * | 8/2015 | Angel, Jr. | H04R 1/105 381/74 |
| 2015/0378546 A1 * | 12/2015 | Osborne | G06F 3/04847 715/833 |
| 2016/0050486 A1 | 2/2016 | Uggla | |
| 2016/0193085 A1 | 7/2016 | Jenkins et al. | |
| 2016/0210956 A1 | 7/2016 | Huang | |
| 2017/0230746 A1 | 8/2017 | Silvestri | |
| 2017/0330539 A1 * | 11/2017 | Little | G10H 1/0066 |
| 2018/0069815 A1 * | 3/2018 | Fontana | H04L 51/04 |
| 2019/0069074 A1 | 2/2019 | Yamkovoy | |
| 2019/0189106 A1 | 6/2019 | Hull et al. | |
| 2019/0189196 A1 | 6/2019 | Robison et al. | |

(56) References Cited

U.S. PATENT DOCUMENTS

| | | | |
|---|---|---|---|
| 2019/0313179 A1 | 10/2019 | Saule et al. | |
| 2020/0077172 A1 | 3/2020 | England et al. | |
| 2020/0387719 A1 | 12/2020 | Jung | |
| 2020/0389719 A1 | 12/2020 | Morris et al. | |
| 2022/0014837 A1 | 1/2022 | Kikuchi et al. | |
| 2022/0279267 A1 | 9/2022 | Johnson et al. | |
| 2023/0164488 A1 | 5/2023 | Degner et al. | |

FOREIGN PATENT DOCUMENTS

| | | |
|---|---|---|
| EM | 008507867-0001 | 4/2021 |
| EM | 009101447-0001 | 7/2022 |
| GB | 9003743228-0001 | 2/2017 |
| GB | 9008057400-0001 | 7/2020 |
| GB | 9008308431-0004 | 12/2020 |
| IN | 334368-001-0001 | 10/2020 |
| JP | 1502702 S | 6/2014 |
| JP | 1617671 S | 10/2018 |
| JP | 1673628 S | 11/2020 |
| JP | 1730548 S | 11/2022 |

OTHER PUBLICATIONS

Bernard, "The Bowers & Wilkins PX headphones offer big sound at a high price", techcrunch, Jan. 22, 2018, retrieved from https://techcrunch.com/2018/01/22/review-bowers-and-wilkins-px-wireless-headphones/ on Aug. 21, 2020, 13 pgs.

Bhalla, "Bose Quiet Comfort 35 II Review: Easily The Best Wireless Noise-Cancelling Headphones Yet", mensxp, Jan. 26, 2018, retrieved from https://www.mensxp.com/technology/reviews/42230-bose-quiet-comfort-35-ii-review-easily-the-best-wireless-noise-cancelling-headphones-yet.html on Aug. 20, 2020, 24 pgs.

Carnoy, "Microsoft Surface Headphones: Hands-on with Microsoft's new Bose-buster noise-canceling headphones", cnet, Oct. 2, 2018, retrieved from https://www.cnet.com/reviews/microsoft-surface-headphones-preview/ on Aug. 20, 2020, 12 pgs.

Krol, "Beoplay H4 review: Pricey, but you can hear what you pay for", Mashable, Jul. 5, 2018, retrieved from https://mashable.com/2018/07/05/beoplay-h4-review/ on Aug. 20, 2020, 26 pgs.

Savov, "Sony 1000X M3 Review: Supreme Noise Canceling", The Verge, Sep. 11, 2018, retrieved from https://www.theverge.com/2018/9/11/17844914/sony-1000x-m3-review-noise-canceling-headphones on Aug. 20, 2020, 11 pgs.

Stark, "Beats' best: Beats Studio 3 Wireless reviewed", pickr, May 31, 2018, retrieved from https://www.pickr.com.au/reviews/2018/beats-studio-3-wireless-headphones/ on Aug. 20, 2020, 25 pgs.

Steele, "B&O Beoplay H8i and H9i headphones review: Diminishing returns", engadget, Apr. 28, 2018, retrieved from https://www.engadget.com/2018-04-28-bang-olufsen-beoplay-h8i-h9i-headphones-review.html on Aug. 20, 2020, 25 pgs.

"Get Navi", Gakken Publishing Co., Ltd., HA30004687, Jul. 30, 2018, vol. 20, No. 9, p. 3, 3 pages.

"Premium Headphone Guide Magazine", Ongen Publishing Co., Ltd., RA02005238, May 25, 2020, vol. 14, p. 87, 3 pages.

* cited by examiner

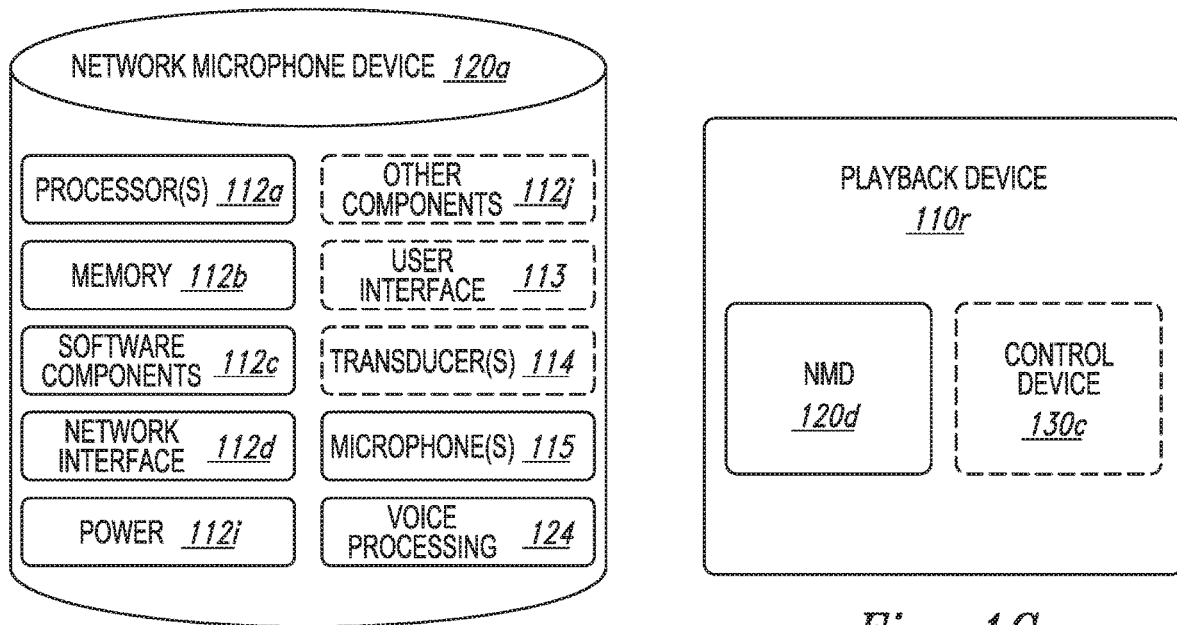
Fig. 1F
Fig. 1G
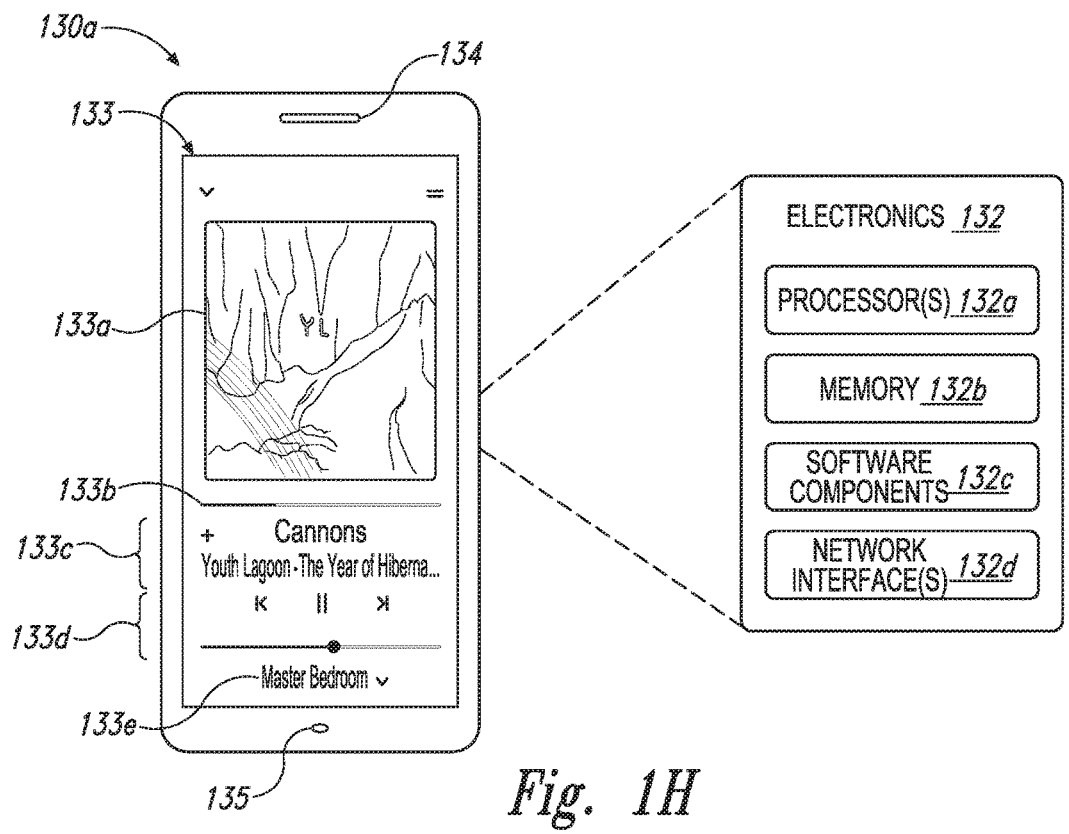
Fig. 1H

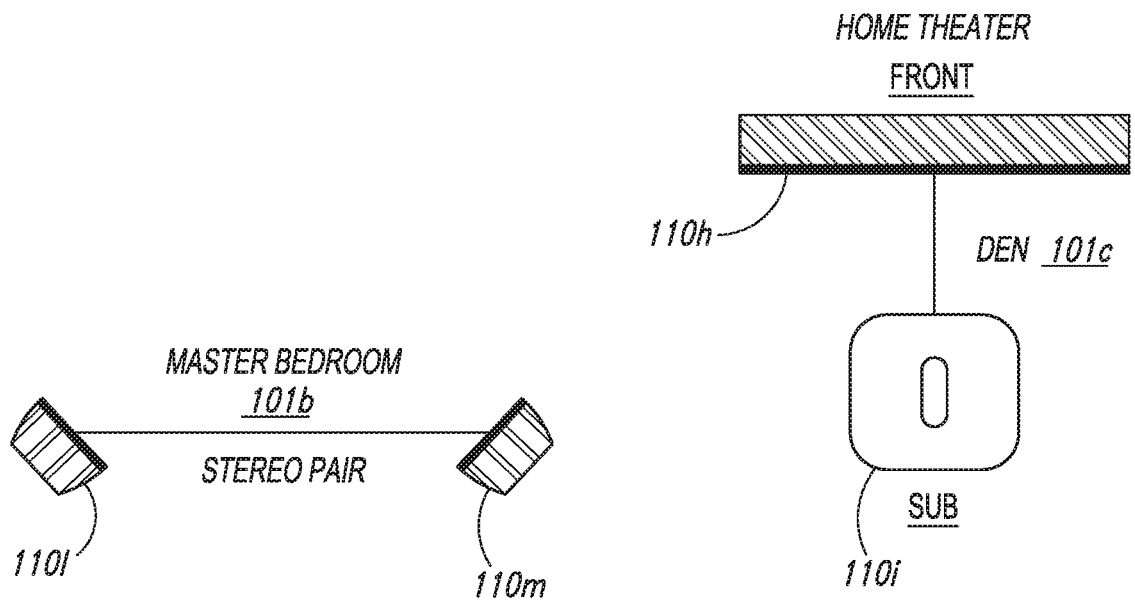
Fig. 1I
Fig. 1J
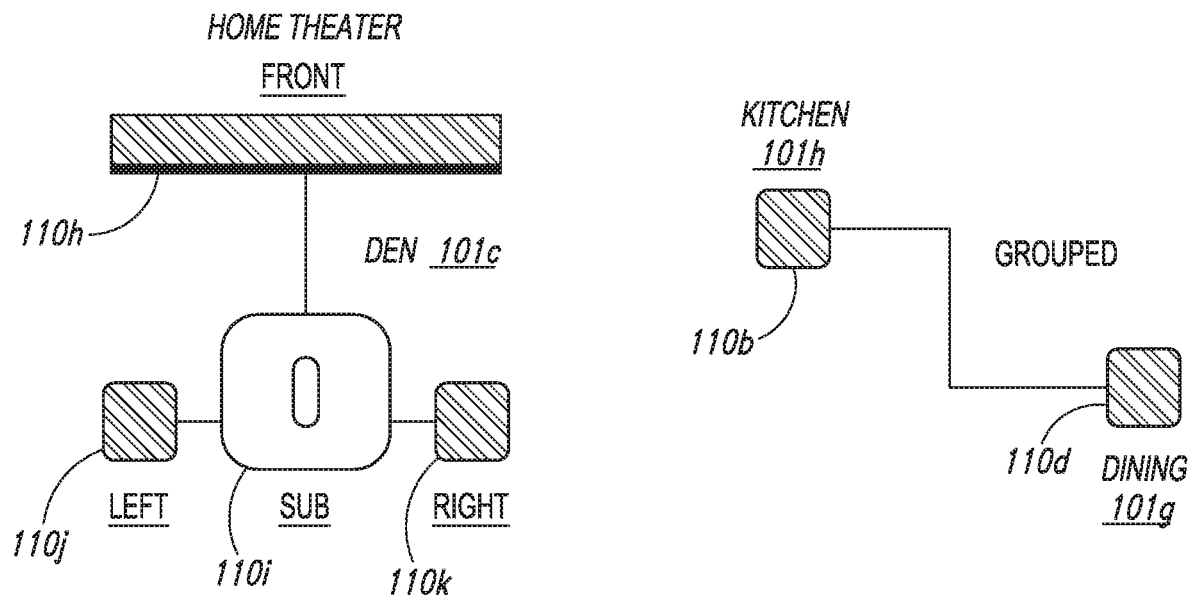
Fig. 1K
Fig. 1L

SYSTEMS AND METHODS FOR CONTROLLING PLAYBACK AND OTHER FEATURES OF A WIRELESS HEADPHONE

RELATED APPLICATIONS

This patent is a continuation of U.S. patent application Ser. No. 16/583,094 filed Sep. 25, 2019, the disclosure of which is hereby incorporated by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY OF THE INVENTION

Systems and methods for controlling playback and other features of a wireless headphone are disclosed.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device in accordance with certain embodiments of the invention.

FIG. 1G is a block diagram of a playback device in accordance with certain embodiments of the invention.

FIG. 1H is a partial schematic diagram of a control device in accordance with certain embodiments of the invention.

FIGS. 1-I through 1L are schematic diagrams of corresponding media playback system zones in accordance with certain embodiments of the invention.

Figure 1A:
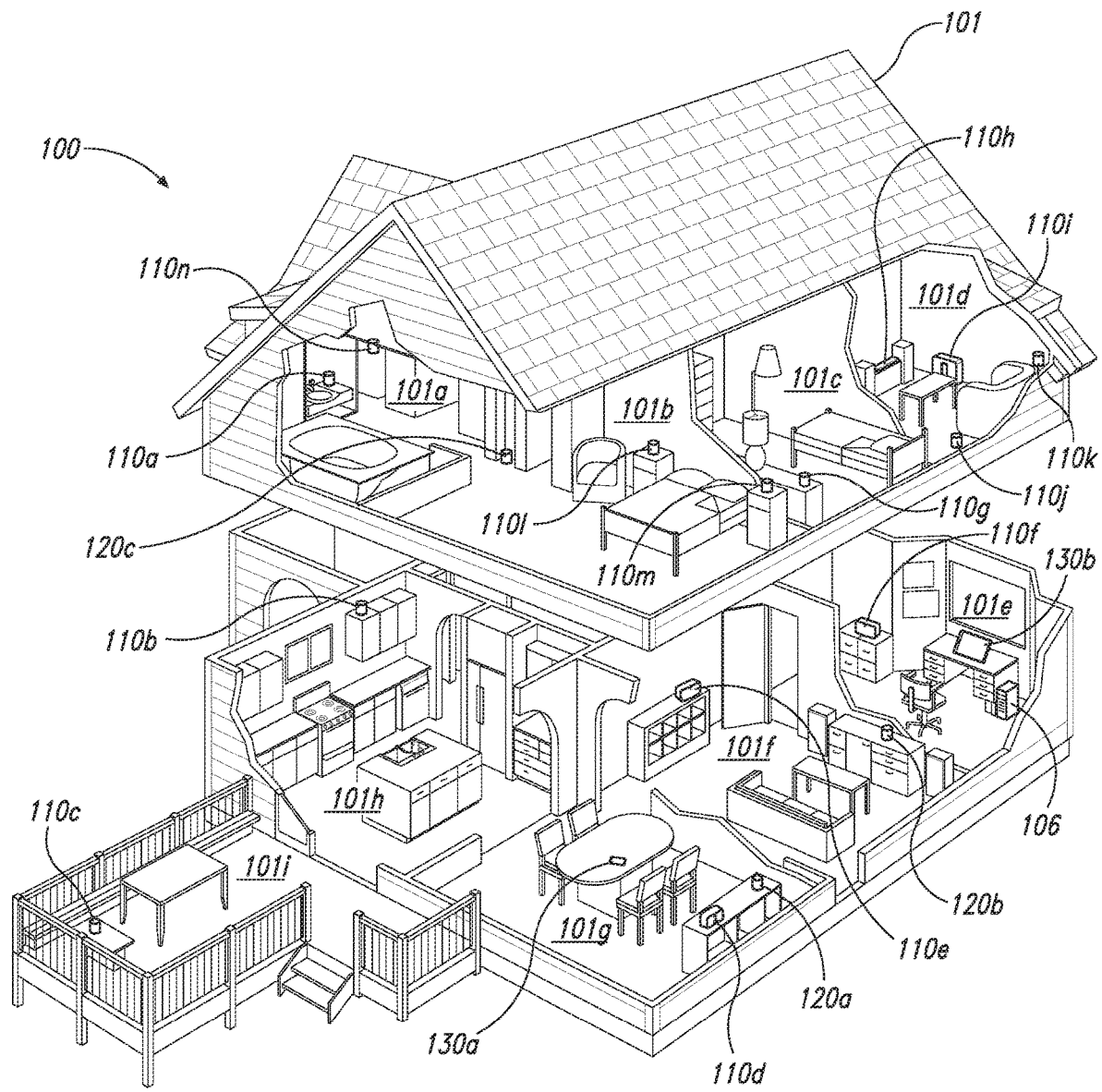
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to controlling playback and other features of a wireless headphone.

Wireless headphones discussed herein can utilize digital communications over a wireless link (e.g., Bluetooth, WiFi, etc.) to receive audio data from any of a variety of media sources. Media may be received by a wireless headphone from a separate computing device, such as a personal computer, smartphone, or tablet or a playback device, such as a smart speaker or smart television. Media may also be received by the wireless headphone from a media streaming service, such as Spotify, iTunes, or Amazon, etc. Wireless headphones may further have onboard storage for media as well.

An example wireless headphone as discussed herein may include a user interface via which a wearer of the wireless headphone can manage media playback by and/or otherwise control the wireless headphone. In one embodiment, the user interface may include a microphone and the wearer may use voice commands to manage media playback. In another embodiment, the user interface may include one or more physical buttons or other mechanical means via which the wearer can manage media playback.

The many capabilities of a wireless headphone as described herein may result in a plethora of control possibilities and options via the user interface of the wireless headphone. Embodiments described herein specify certain locations and user interactions to activate controls on a wireless headphone that are intuitive, elegant, and accessible to a typical user.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
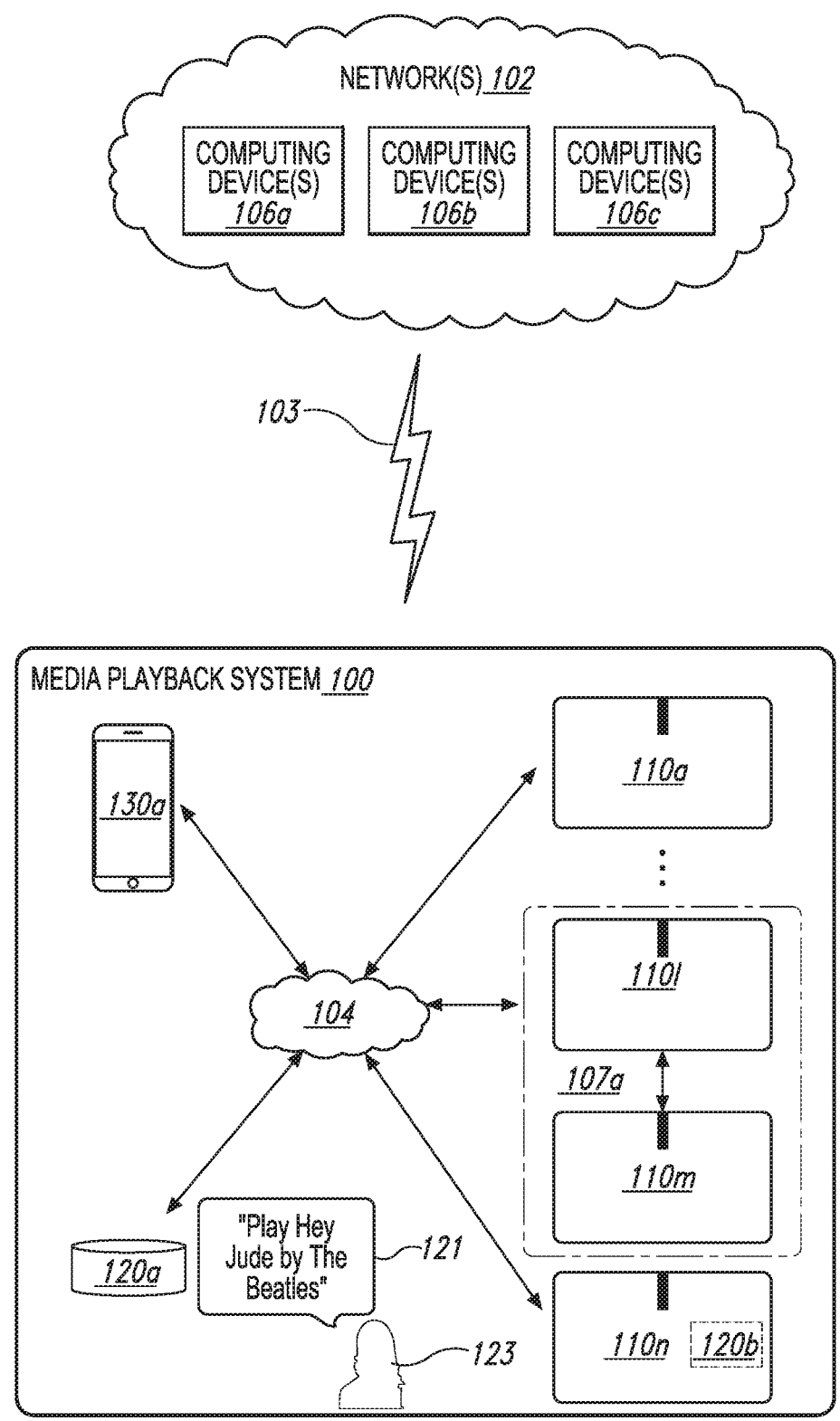
FIG. 1B is a schematic diagram of the media playback system of FIG. 1A and one or more networks.

FIG. 1B is a schematic diagram of the media playback system 100 and at least one cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. In many embodiments, a cloud network 102 is configured to deliver media content (e.g., audio content, video content, photographs, social media content) to the media playback system 100 in response to a request transmitted from the media playback system 100 via the links 103. In some embodiments, a cloud network 102 is configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) facilitate one or more operations on behalf of the media playback system 100.

In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103.

In response to receiving the voice input data, the computing device 106c processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106c may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

b. Suitable Playback Devices

Figure 1C:
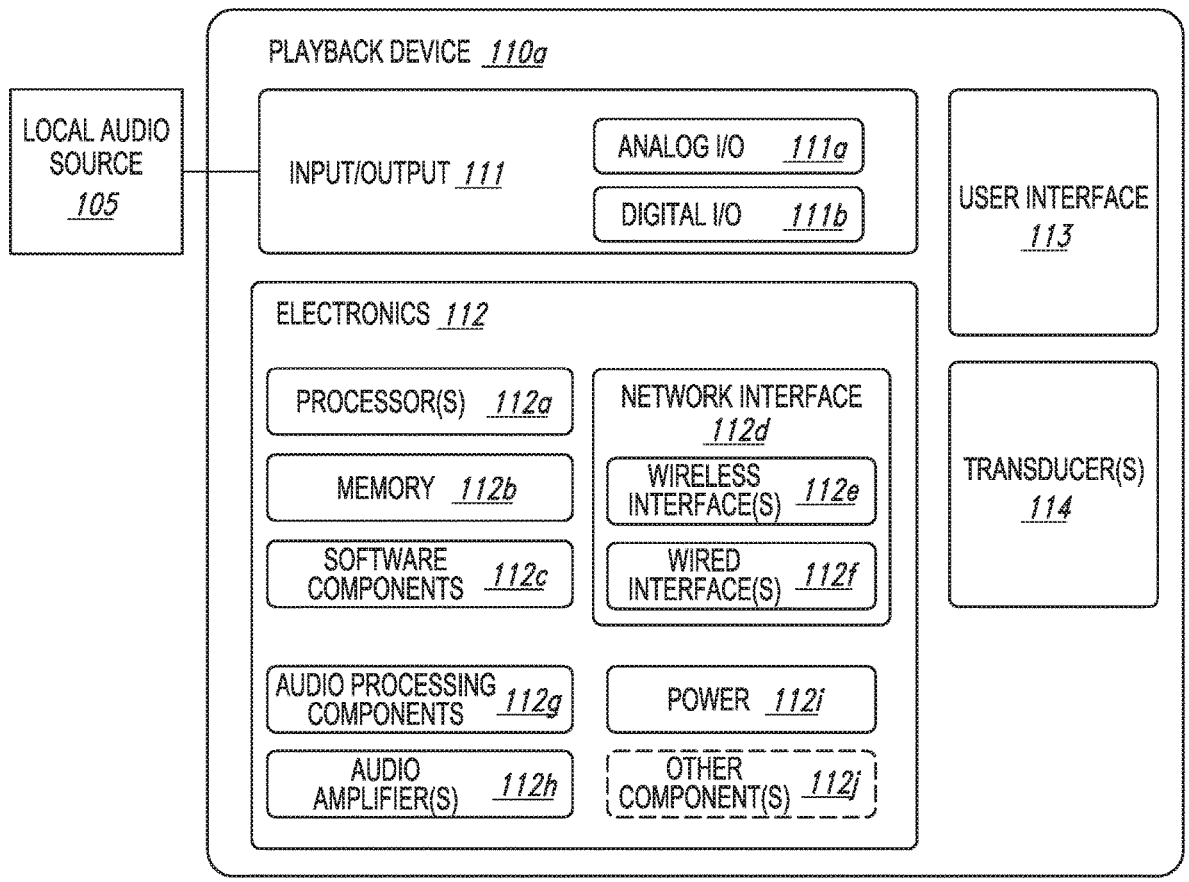
FIG. 1C is a block diagram of a playback device in accordance with certain embodiments of the invention.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
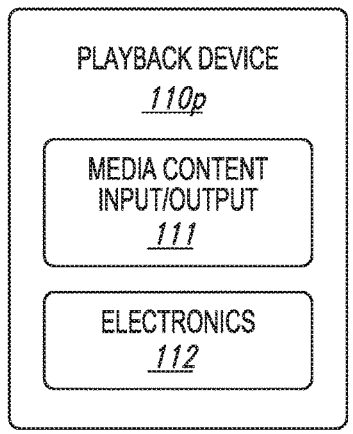
FIG. 1D is a block diagram of a playback device in accordance with certain embodiments of the invention.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
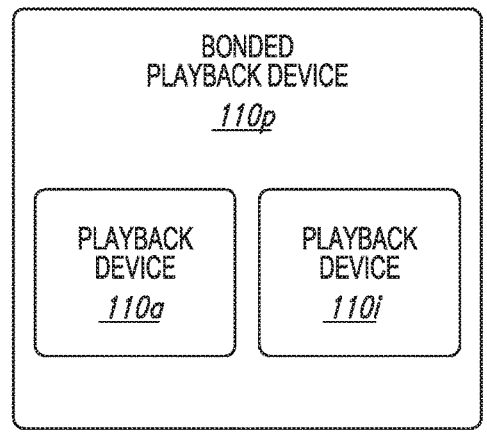
FIG. 1E is a block diagram of a network microphone device in accordance with certain embodiments of the invention.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
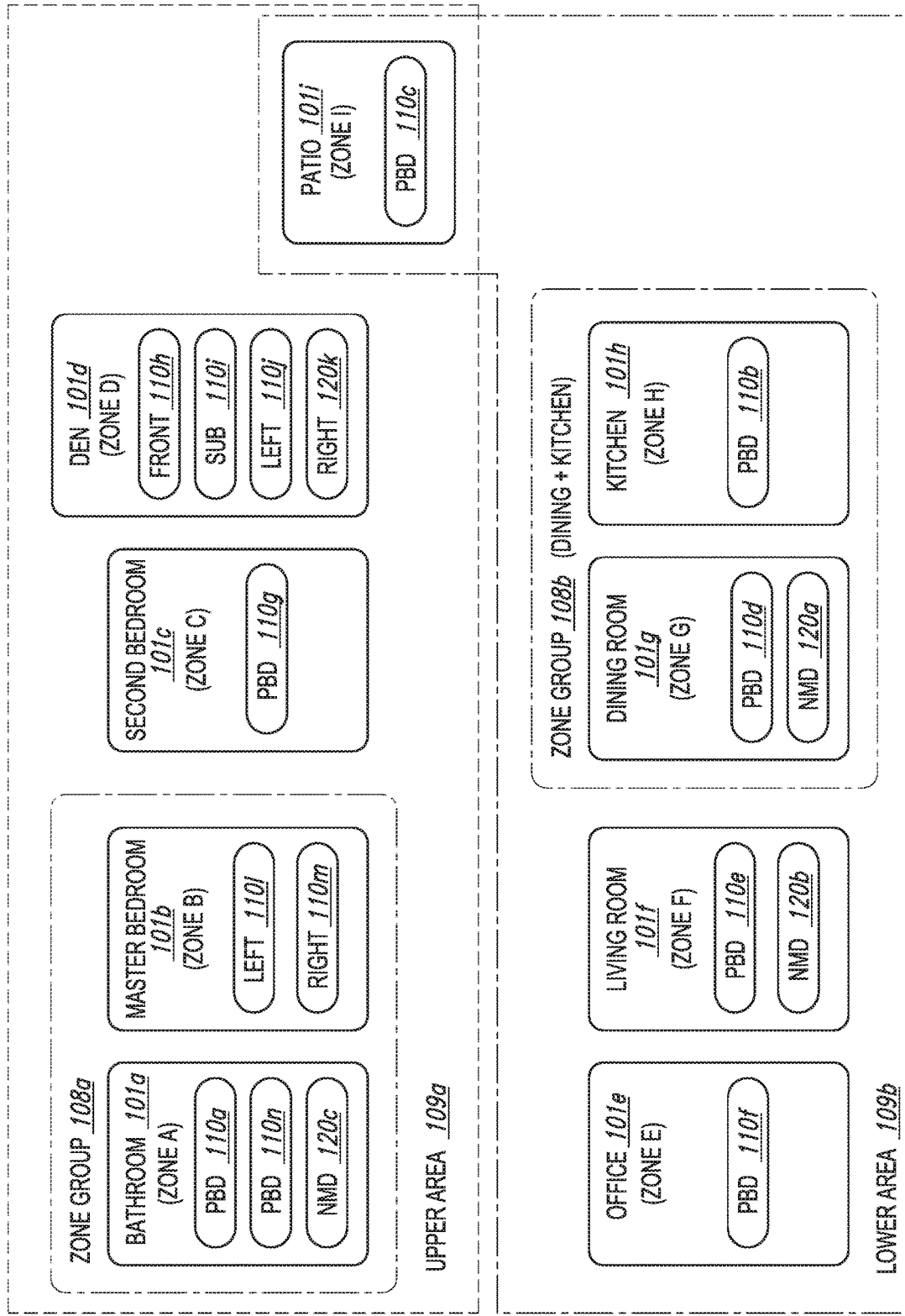
FIG. 1M is a schematic diagram of media playback system areas in accordance with certain embodiments of the invention.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in U.S. Patent Publication No. 2017/0242653 titled "Voice Control of a Media Playback System," the relevant disclosure of which is hereby incorporated by reference herein in its entirety.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Patent Publication No. 2018/0107446 filed Aug. 21, 2017 and titled "Room Association Based on Name," and U.S. Pat. No. 8,483,853 filed Sep. 11, 2007, and titled "Controlling and manipulating groupings in a multi-zone media system." One playback device in a group can be identified as a group coordinator for the group, such as described in U.S. Patent Publication No. 2017/0192739 titled "Group Coordinator Selection." The relevant disclosure of each of these applications is incorporated herein by reference in its entirety. In some embodiments, the media playback system 100 may not implement Areas, in which case the system may not store variables associated with Areas.

III. Example Systems and Devices

Figure 2A:
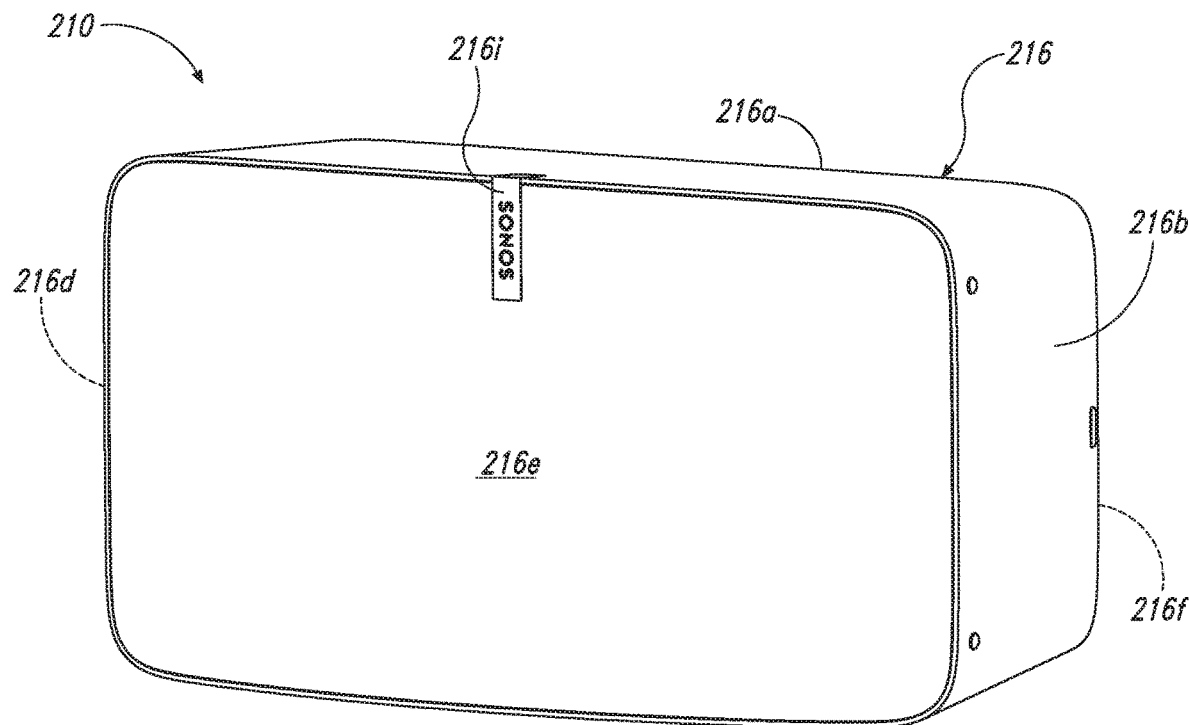
FIG. 2A is a front isometric view of a playback device configured in accordance with certain embodiments of the invention.
Figure 2B:
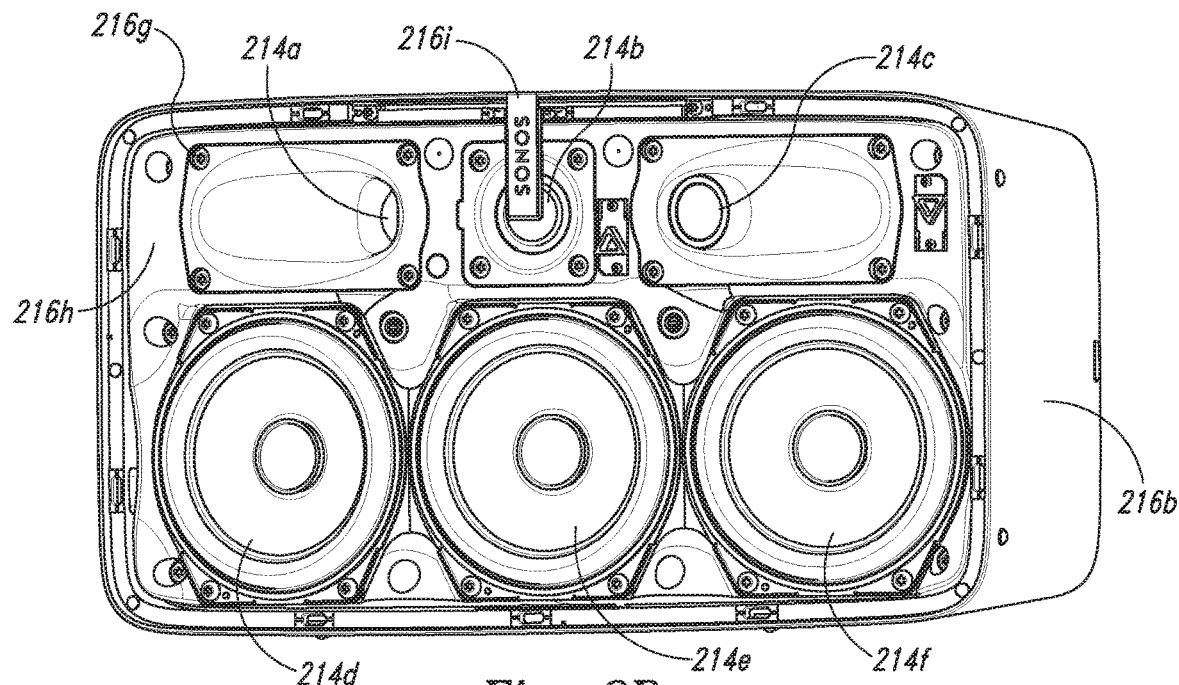
FIG. 2B is a front isometric view of the playback device of FIG. 3A without a grille.
Figure 2C:
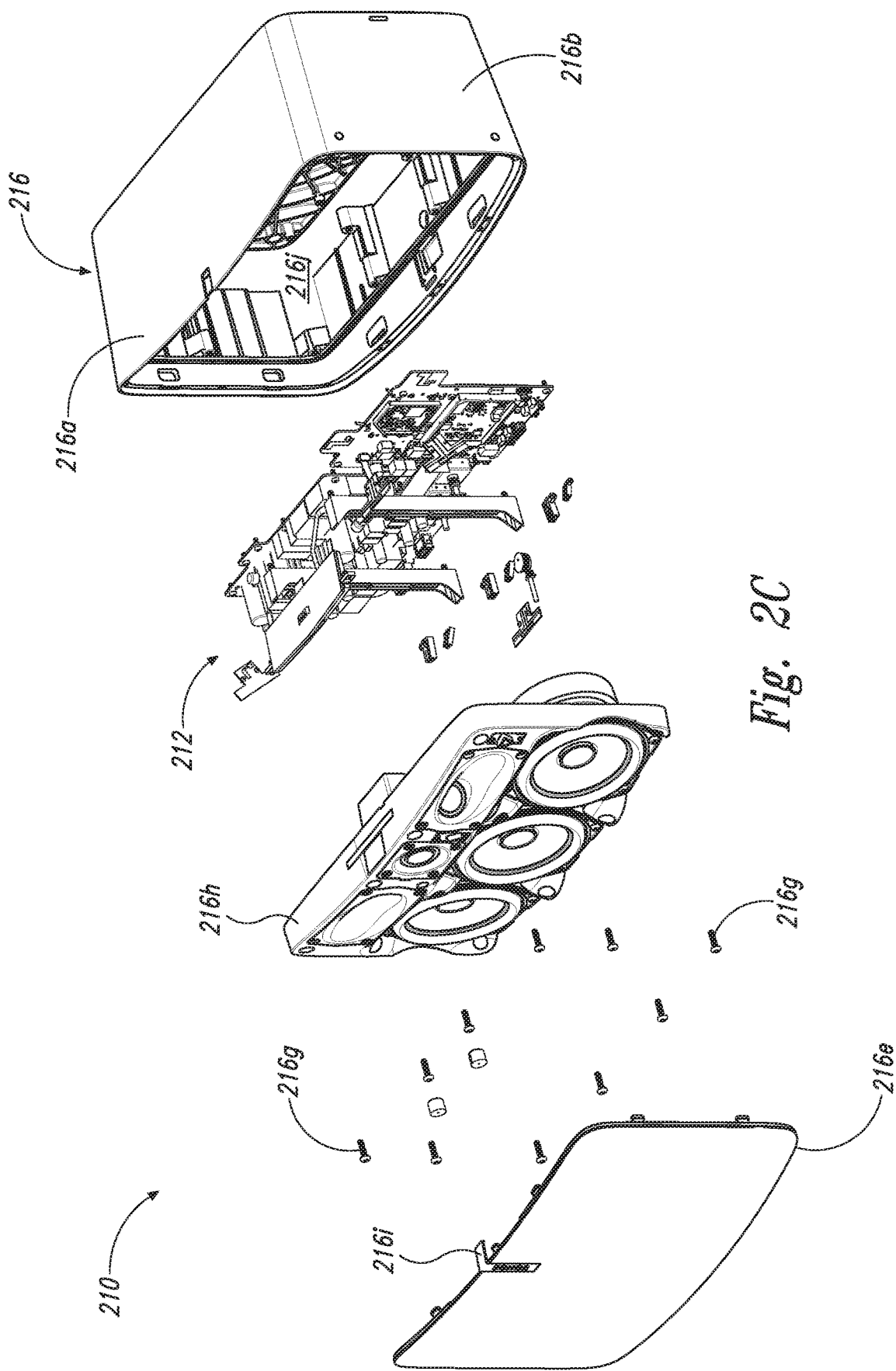
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C.

For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
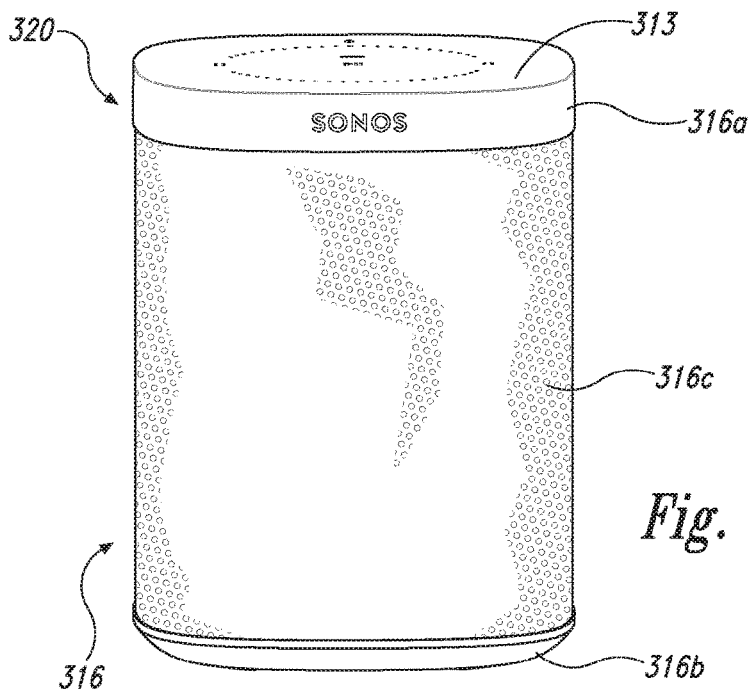
FIG. 3A is a front view of a network microphone device configured in accordance with certain embodiments of the invention.
Figure 3B:
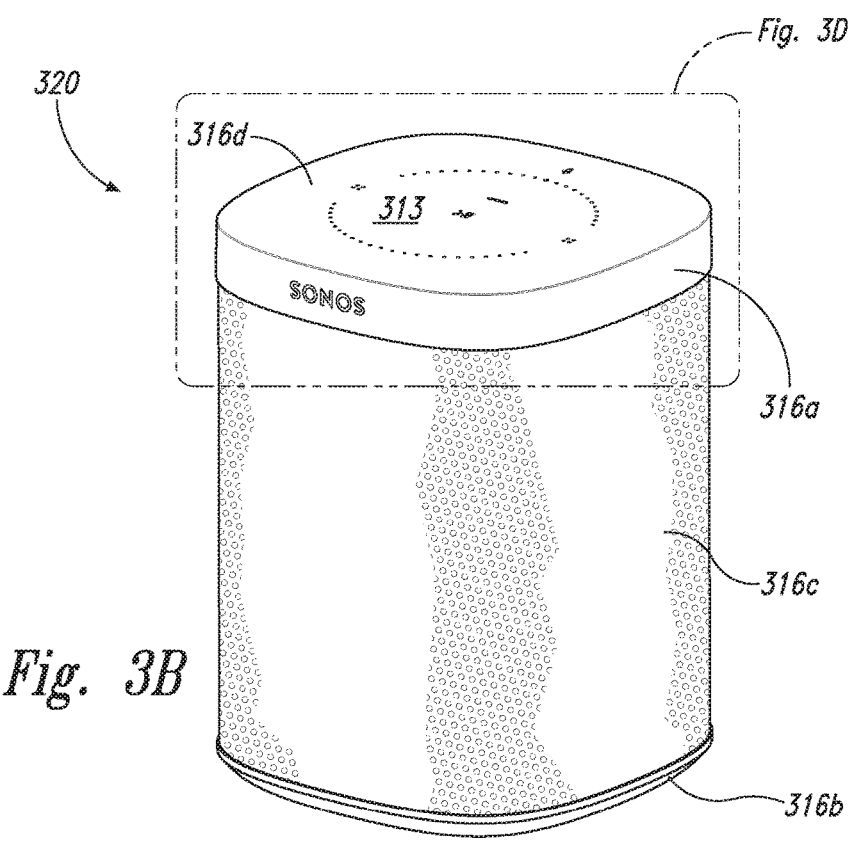
FIG. 3B is a side isometric view of the network microphone device of FIG. 3A.
Figure 3C:
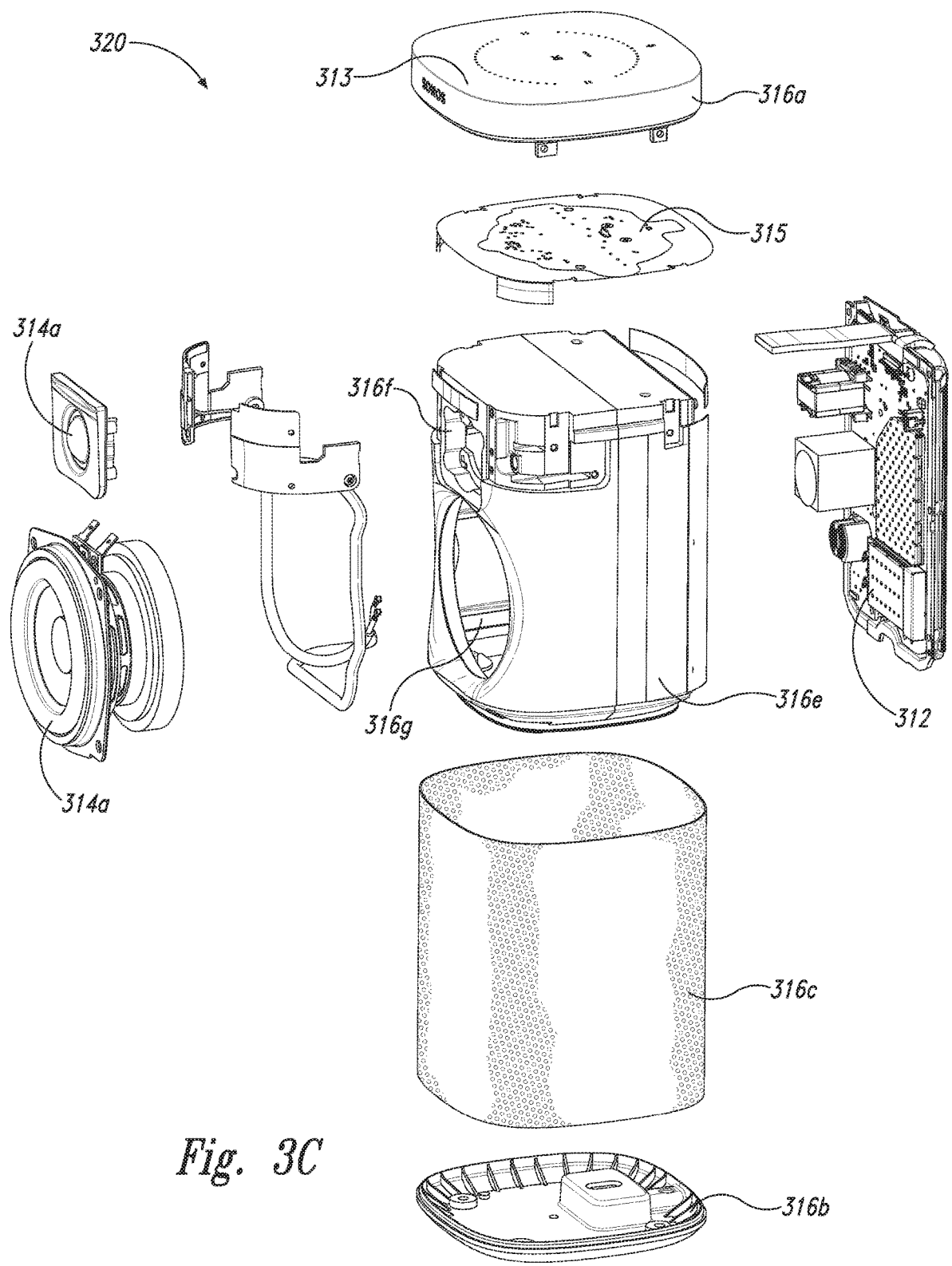
FIG. 3C is an exploded view of the network microphone device of FIGS. 3A and 3B.
Figure 3D:
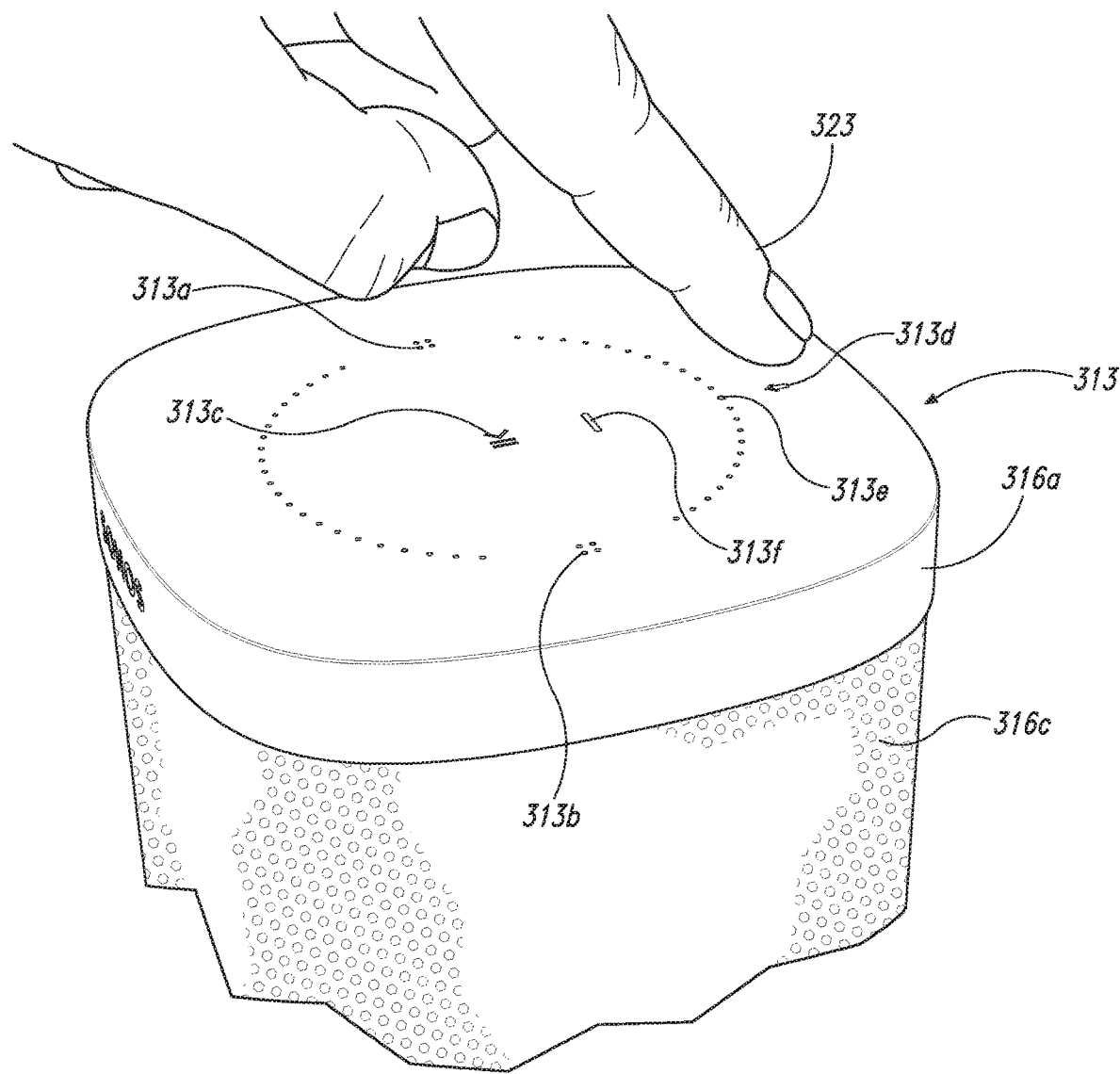
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313E Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
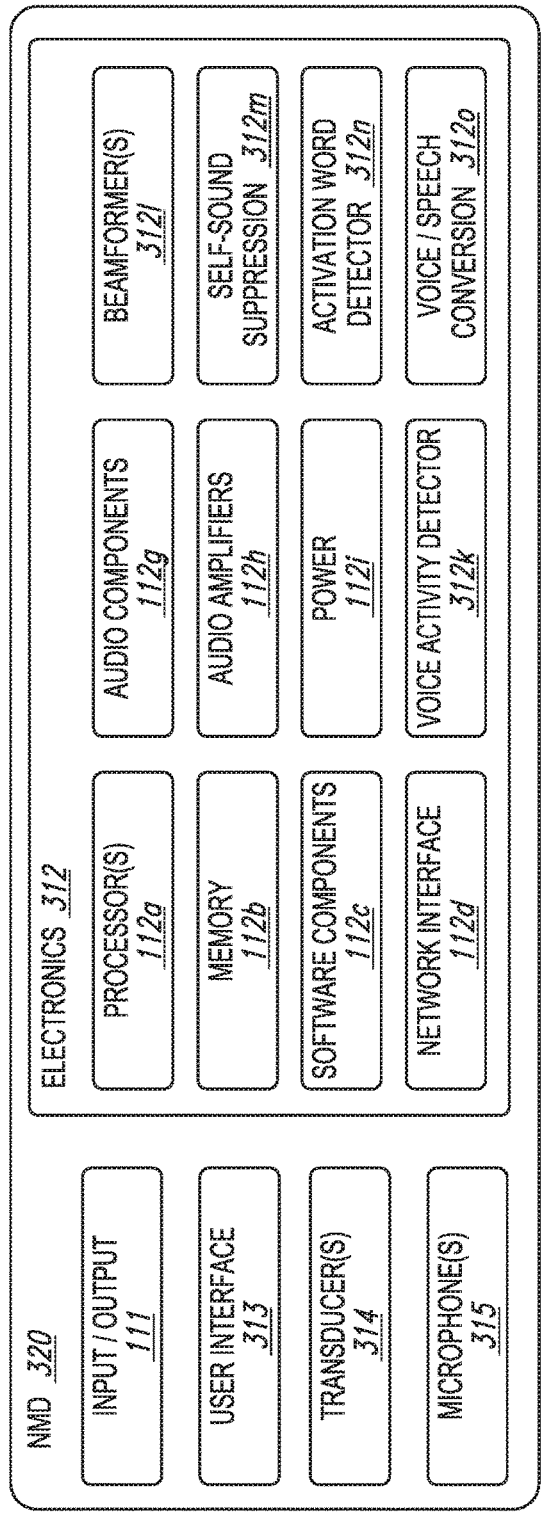
FIG. 3E is a block diagram of the network microphone device of FIGS. 3A-3D in accordance with certain embodiments of the invention.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
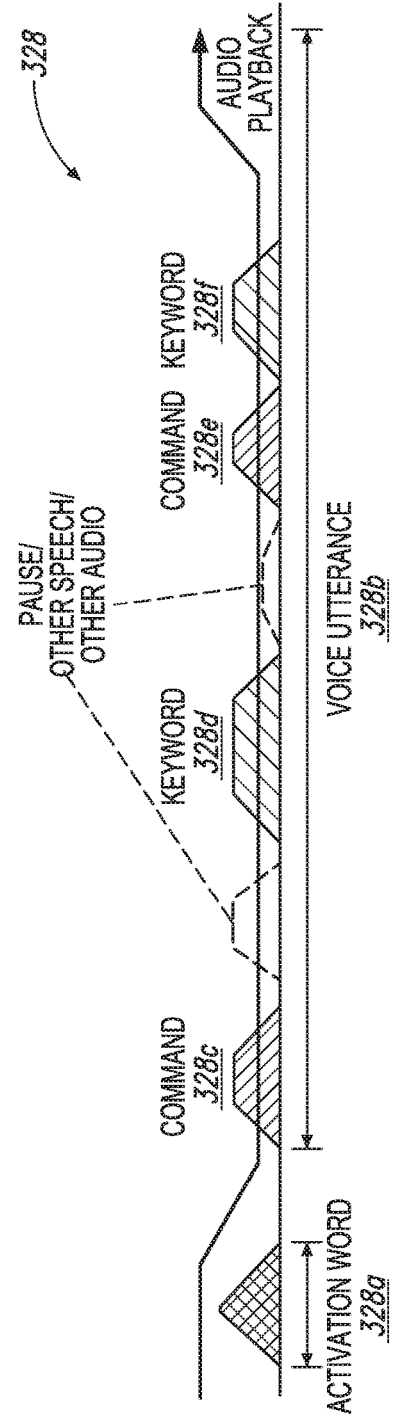
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. Patent Publication No. 2017/0242653 titled "Voice Control of a Media Playback System," the relevant disclosure of which is hereby incorporated by reference herein in its entirety.

Figure 4A:
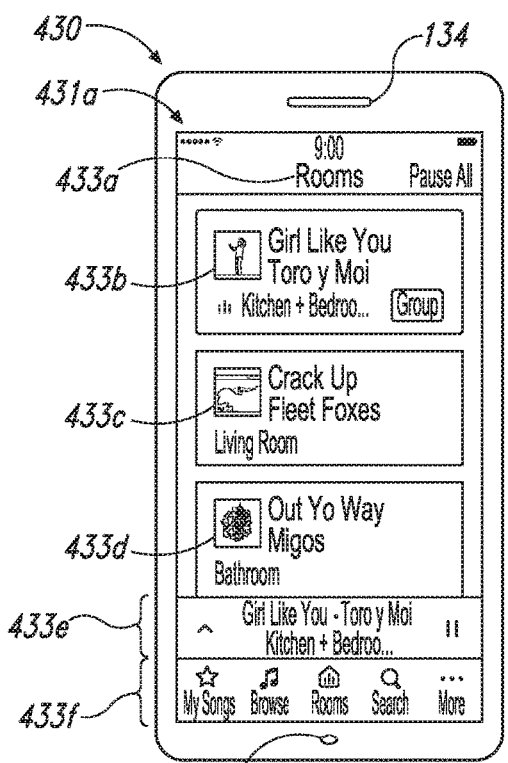
FIGS. 4A-4D are schematic diagrams of a control device in various stages of operation in accordance with certain embodiments of the invention.
Figure 4B:
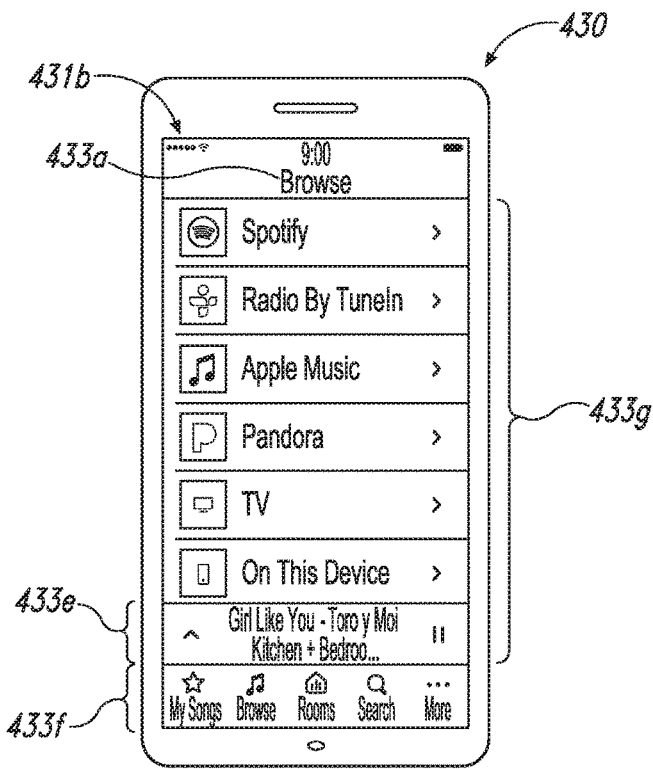
Figure 4C:
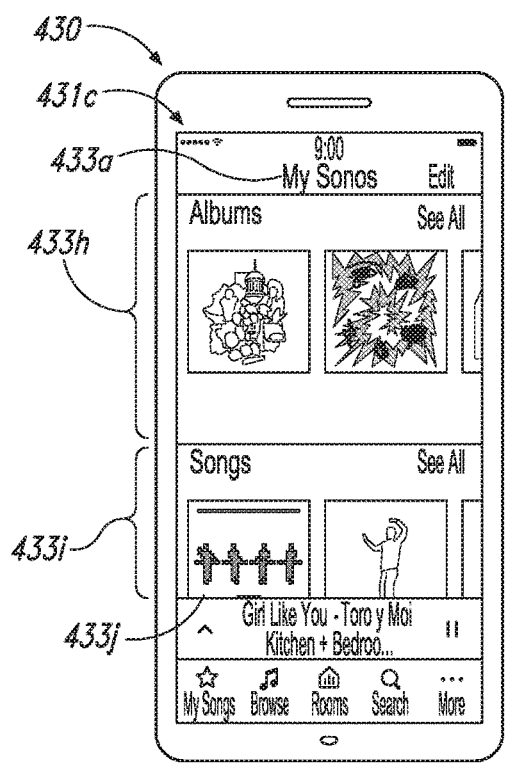
Figure 4D:
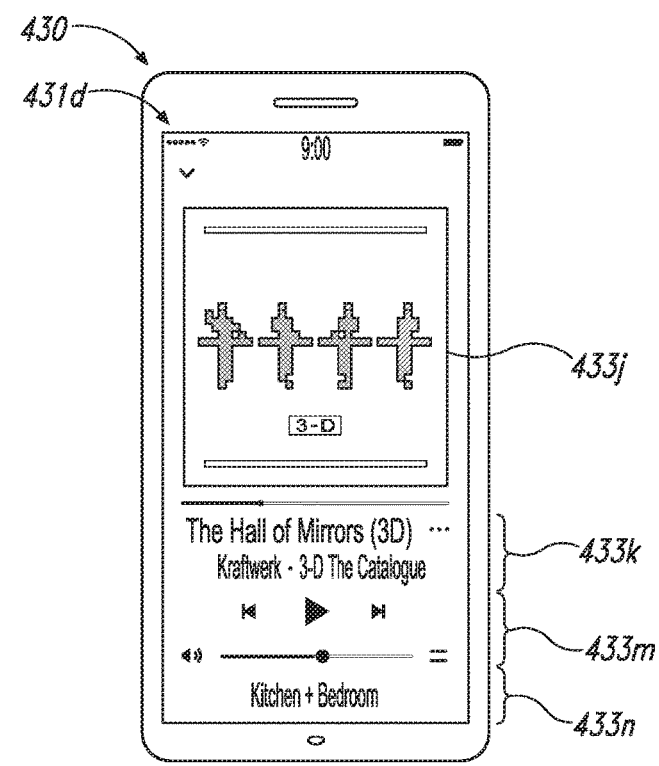

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
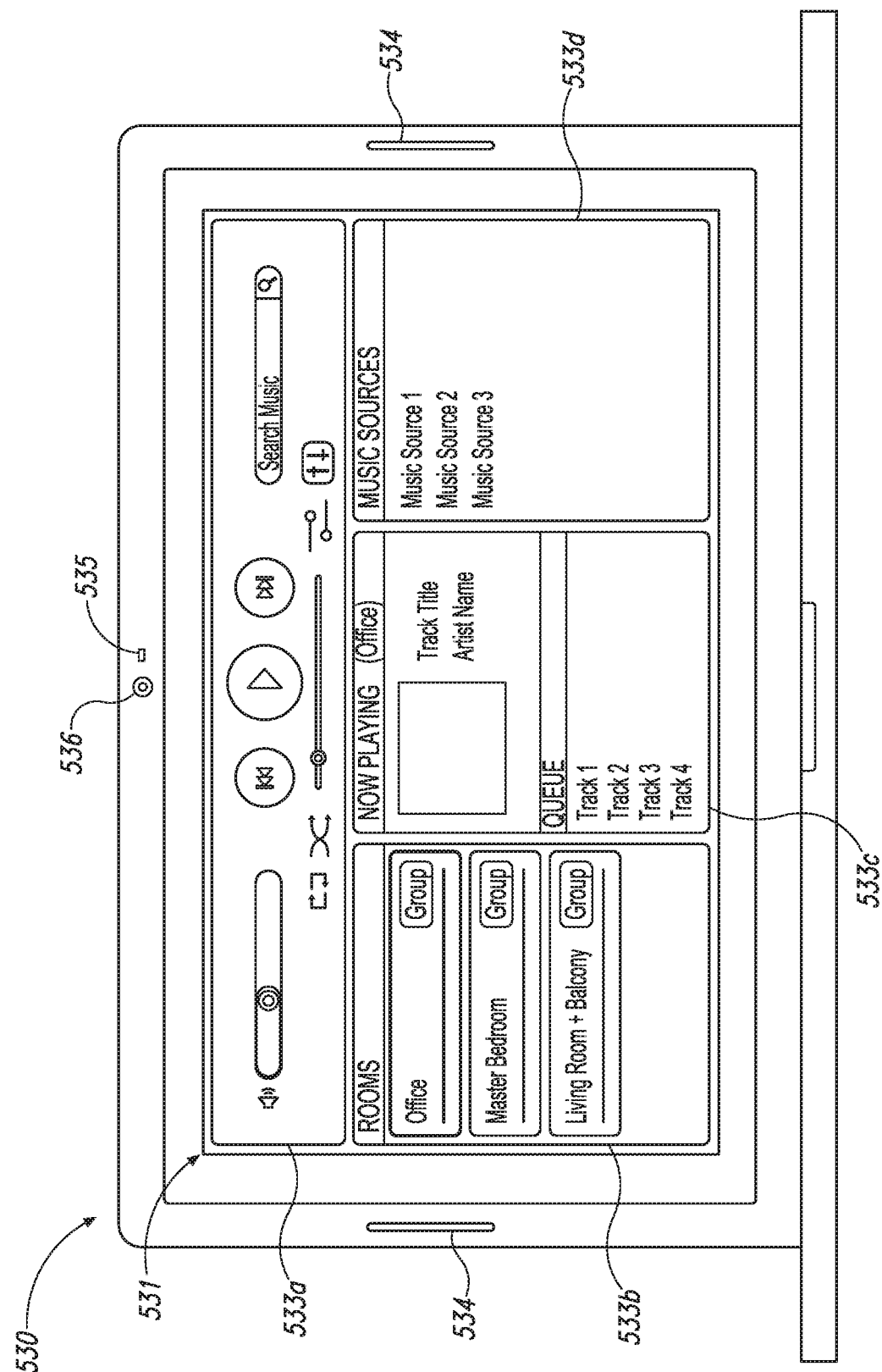
FIG. 5 is front view of a control device in accordance with certain embodiments of the invention.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
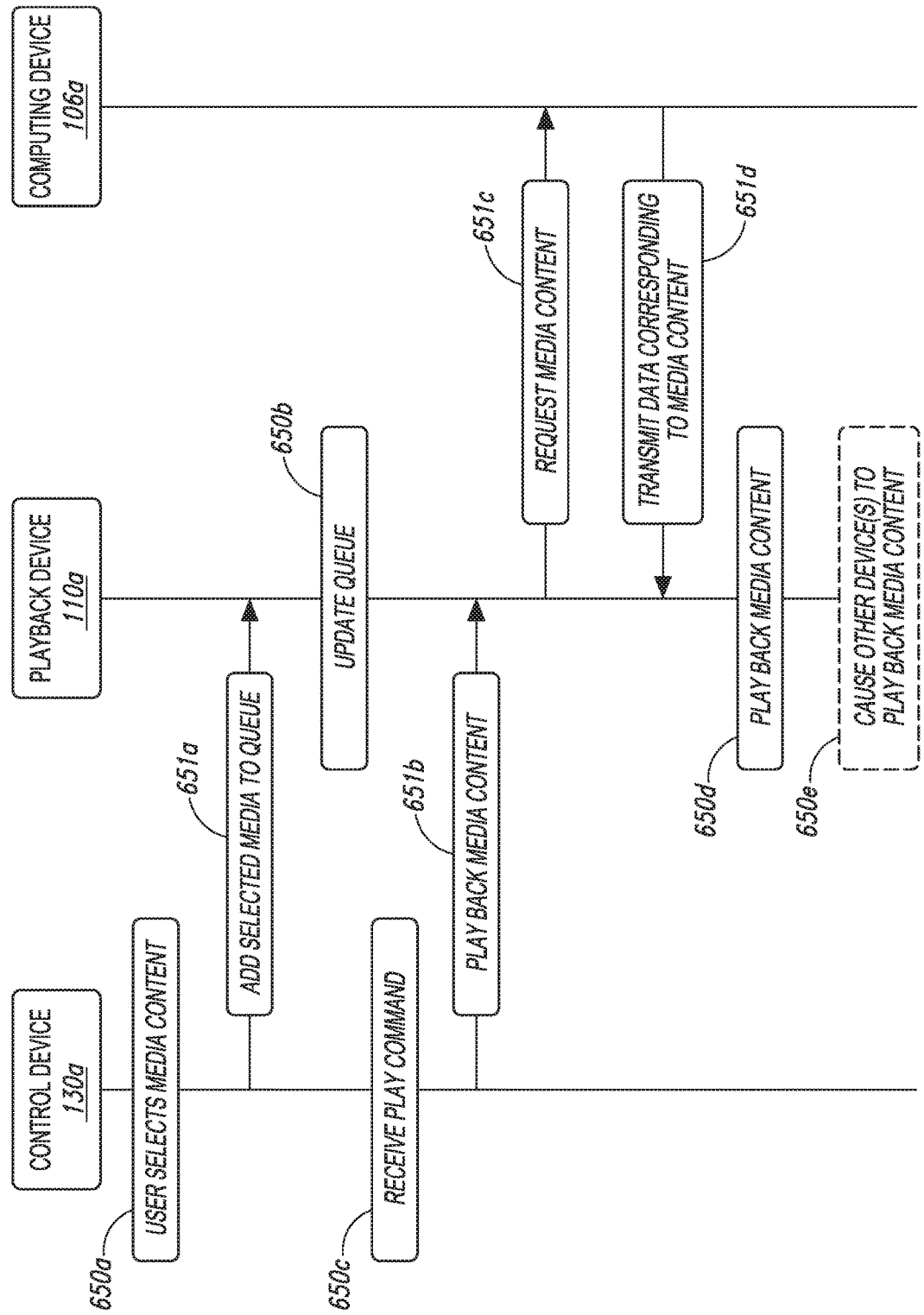
FIG. 6 is a message flow diagram of a media playback system in accordance with certain embodiments of the invention.
Figure 7:
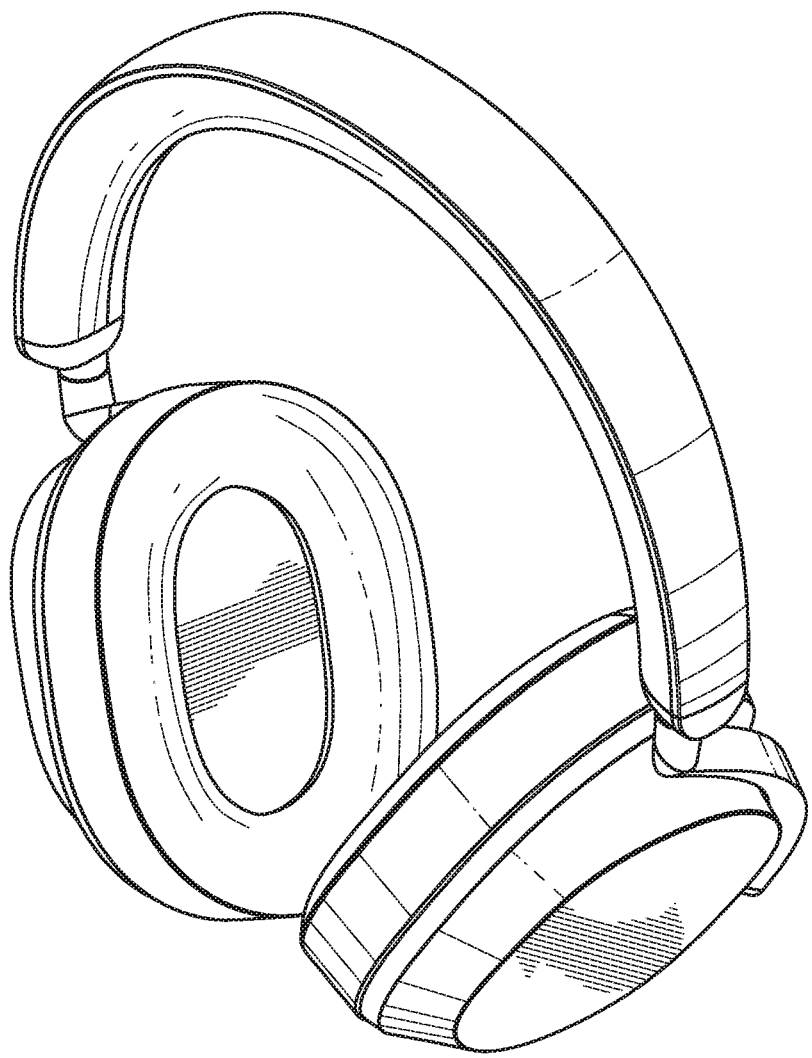
FIG. 7 illustrates a perspective view of a first wireless headphone design in accordance with certain embodiments of the invention.
Figure 8:
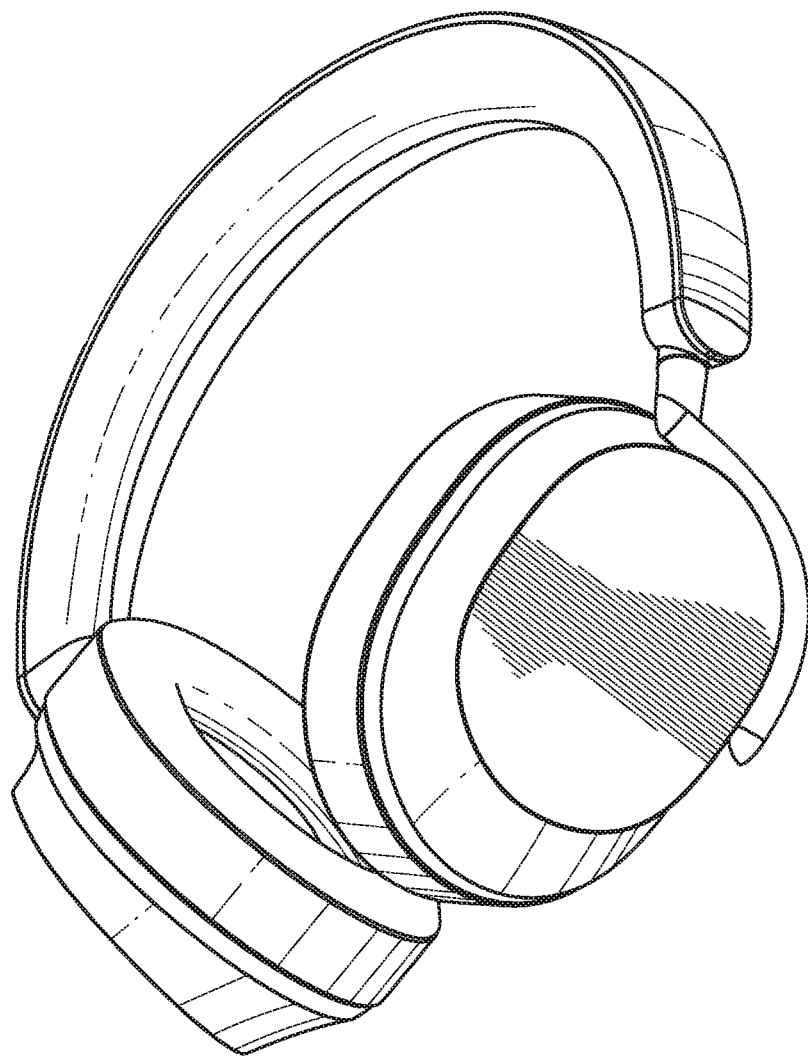
FIG. 8 illustrates a second perspective view of a first wireless headphone design in accordance with certain embodiments of the invention.
Figure 9:
FIG. 9 illustrates a front view of a first wireless headphone design in accordance with certain embodiments of the invention.
Figure 10:
FIG. 10 illustrates a rear view of a first wireless headphone design in accordance with certain embodiments of the invention.
Figure 11:
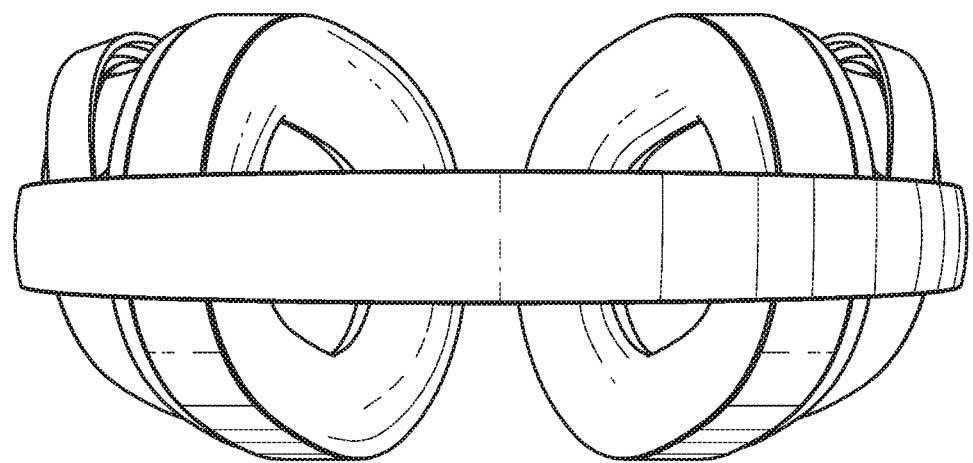
FIG. 11 illustrates a top view of a first headphone design in accordance with certain embodiments of the invention.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Controlling Playback and Other Features of a Wireless Headphone

In some embodiments of the invention, at least one playback device is a wireless headphone having two or more speaker drivers and electronics such as those described above with respect to FIG. 1C. The speaker drivers may be housed in a left earcup and a right earcup that each also have an earpad for resting on a user's head. In several embodiments, the earcups are joined by a headband. In further embodiments, the wireless headphone is playback device that is also a network microphone device (NMD), equipped with a microphone, such as those described above with respect to FIG. 1F. These headphones may be utilized in a media playback system such as those illustrated in FIGS. 1A and 1B. In various embodiments, the wireless headphone may be connected (via Bluetooth or other wireless communications link) to a mobile device or other computing system. The controls described below may control functions on the wireless headphone or the mobile device (or other computing system).

Embodiments of the invention specify certain locations and user interactions to activate controls on a wireless headphone that are intuitive, elegant, and accessible to a typical user. As will be discussed below with respect to different embodiments, controls can include communication controls to direct aspects of device functions such as making calls (e.g., voice assistant, call answer/end, etc.) and content controls to direct aspects of playing back media content (e.g., play/pause, next/previous track, volume, etc.). In several embodiments, one or more controls are touch controls that can operate by any of a variety of mechanisms, such as but not limited to capacitive or proximity sensors, which can detect touch from a user at one or more locations on the sensor. Some touch sensors may be an array of touch sensors. While the description below may reference an arrangement having certain controls on a left earcup and others on a right earcup, it is also contemplated that the sides that the controls are on can reversed.

Figure 12:
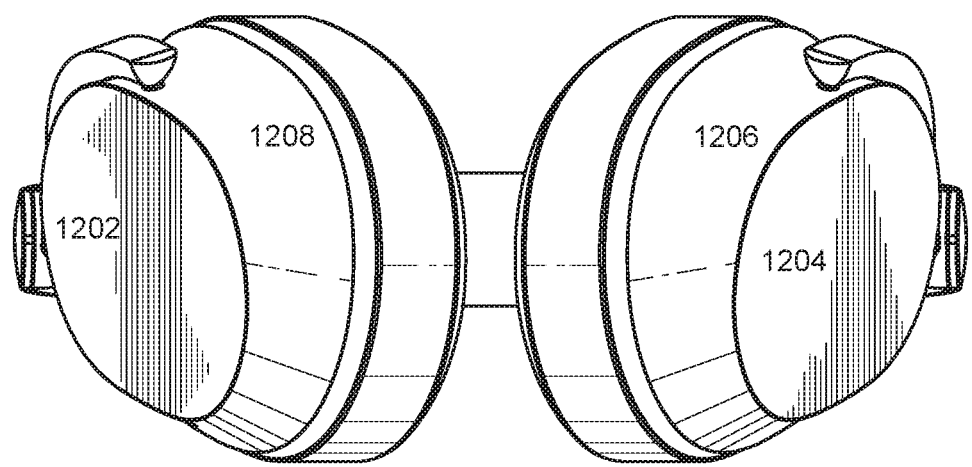
FIG. 12 illustrates a bottom view of a first wireless headphone design in accordance with certain embodiments of the invention.
Figure 13:
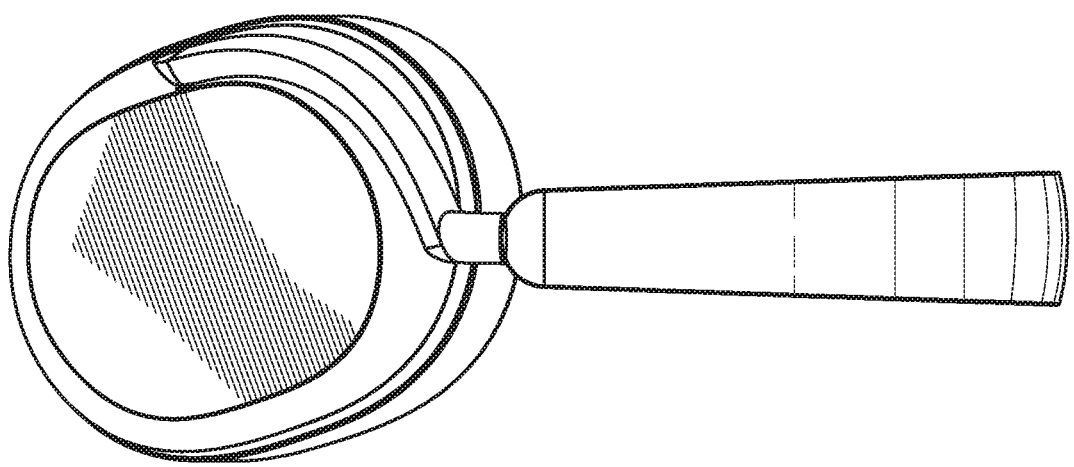
FIG. 13 illustrates a right side view of a first wireless headphone design in accordance with certain embodiments of the invention.
Figure 14:
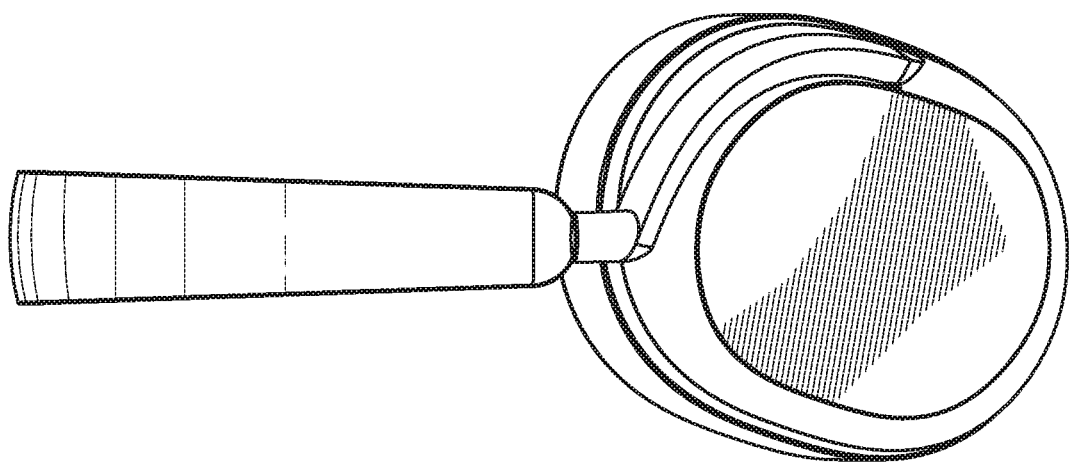
FIG. 14 illustrates a left side view of a first wireless headphone design in accordance with certain embodiments of the invention.
Figure 15:
FIG. 15 illustrates a perspective view of a second wireless headphone design in accordance with certain embodiments of the invention.
Figure 16:
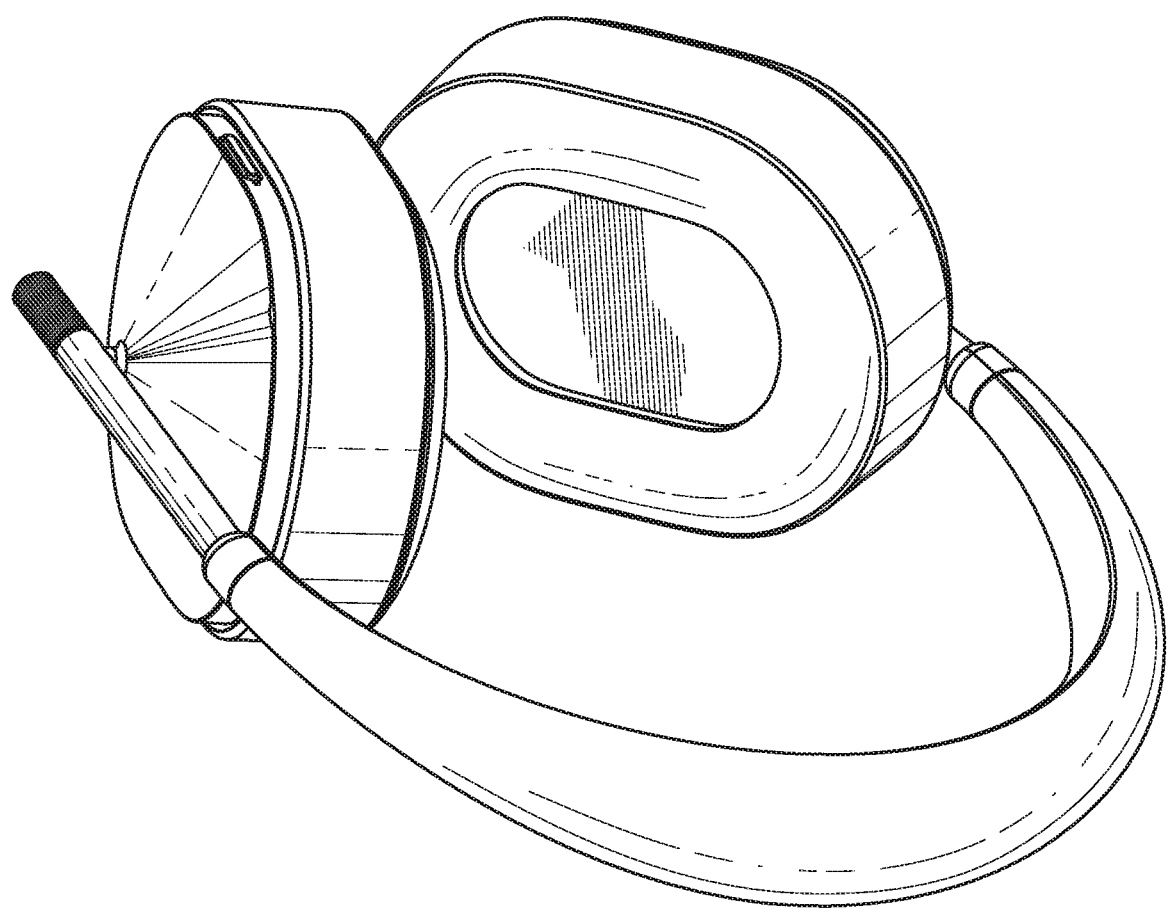
FIG. 16 illustrates a second perspective view of a second wireless headphone design in accordance with certain embodiments of the invention.

Several embodiments utilize a wireless headphone according to first design as illustrated in FIG. 7-14. Communication controls on the wireless headphone include a voice assistant/call control 1202 on the outside surface of the left earcup as shown in FIG. 12. The voice assistant/call control can be a touch control activated by a tap and performs different functions depending on the current activity. The touch control may occupy part of or the entire flat surface in the area of 1202 on the earcup. When the connected playback device is in a phone or teleconference call, a tap ends the call in progress. When a call is ringing, a tap answers the incoming call while a tap and hold rejects the incoming call. When there is no call or ringing, a tap on the voice assistant/call control activates voice recognition.

In many embodiments of the invention, a voice assistant is an application that interprets spoken voice commands captured by a microphone to trigger certain actions as discussed further above. When voice recognition is activated and the microphone captures sound recognized as a wake words for a voice assistant, the voice assistant associated with the given wake word responds. In several embodiments, a number of voice assistants are available, each with a unique wake word. The voice assistant may be hosted by a network service that the wireless headphone connects to directly, or through a mobile device that the wireless headphone is connected to (e.g., via Bluetooth or other wireless communications link).

On the wireless headphone illustrated in FIG. 7-14, content controls include a playback control 1204 on the outside surface of the right earcup that is a touch control as illustrated in FIG. 12. The touch control may occupy part of or the entire flat surface in the area of 1204 on the earcup. Different gestures on the playback control can trigger different functions. In some embodiments, a tap on the playback control toggles between play and pause of the currently playing media content. A forward swipe, from the user's rear to the user's front, skips the media content to the next track. A backward swipe, from the user's front to the user's rear, skips the media content to the previous track. In several embodiments, tapping and holding triggers a swap. A swap involves shifting where content is currently playing to a different device. For example, if a particular piece of content play is currently playing on the wireless headphone, a swap changes the playback to play that piece of content on one or more other playback devices on the local network (or devices that are not on the local network but are associated with the same user account as the wireless headphone). If a particular piece of content play is currently playing on one or more playback devices, a swap changes the playback to play that piece of content on the wireless headphone on the same local network (or wireless headphone that is not on the local network but is associated with the same user account as the playback devices).

In several embodiments, the volume control is a touch slider or strip 1206 at the lower rear corner of the right earcup as illustrated in FIG. 12. In other embodiments, it may be on a different corner of the right earcup or the left earcup. This touch control can detect touch from a user along a particular length of the sensor. Sliding in one direction, for example up, raises the volume. Sliding in the other direction, for example down, lowers the volume. In some embodiments, audible feedback is provided to the user through the speaker as a gradient tone while the volume is being raised or lowered.

Additional controls on the wireless headphone can include, active noise cancellation (ANC), power button, and/or device pairing button. These may be physical buttons or touch controls on either earcup. The ANC control can toggle between different modes of using ANC on the wireless headphone, such as toggling between ANC on and off and/or hear-through mode (i.e., amplifying ambient sound). The power button can be used to simply toggle the headphone on and off. In other embodiments, a long press toggles on and off, while a short press provides the battery status. The device pairing button can be used to enter the headphone into pairing mode (for example via a Bluetooth connection), for example when held during power on or when held for a particular length of time. A status indicator light (such as an LED) may provide feedback about the Bluetooth or other wireless connection. In one embodiment, solid white means the headphone is on but not connected to a Bluetooth device. Solid blue means the headphone is on and connected to a Bluetooth device, while blinking blue means it is in pairing mode. In several embodiments, ANC control is on the left earcup, while power, device pairing, and status indicator are on the right earcup.

In some further embodiments of the invention, the wireless headphone also includes connectors, such as a line-in jack for an audio input (e.g., 3.5 mm) and/or a charge port. In some embodiments, the charge port is a USB-C connector. A charge indicator light (such as an LED) can provide feedback about the charging or battery status of the headphone. For example, breathing amber light pattern can indicate charging, solid amber can indicate that the battery is low, and solid white can indicate that it is fully charged. In some embodiments, line-in is on the left earcup, while charge port and indicator is on the right earcup.

Additional embodiments utilizing the headphone design shown in FIGS. 7-14 has a different arrangement of controls and gestures for using the controls. In this embodiment, similar to the previous embodiment, communication controls on the wireless headphone include a voice assistant/call control on the outside surface of the left earcup. The voice assistant/call control can be a touch control activated by a tap and performs different functions depending on the current activity. When the connected playback device is in a phone or teleconference call, a tap ends the call in progress. When a call is ringing, a tap answers the incoming call while a tap and hold rejects the incoming call.

When there is no call or ringing, a tap on the voice assistant/call control activates voice recognition. In some embodiments, a single tap followed by a wake word activates the voice assistant associated with the recognized wake word, while a double tap followed by a wake word activates the connected mobile device's native voice assistant. In other embodiments, a single tap activates a preselected voice assistant (configured via the connected mobile device or an application on the mobile device), while a double tap activates the mobile device's native voice assistant.

Content controls, volume control, and additional controls may operate the same or similar to those of other embodiments above. In some alternate embodiments, content control for next track and previous track is a double tap and a triple tap respectively on the content control touch sensor.

In still further embodiments utilizing the headphone design shown in FIGS. 7-14, one or more controls and/or connections are similar to those discussed above, except that the communication controls operate differently. In these embodiments, communication controls on the wireless headphone include a voice assistant/call control 1202 on the outside surface of the left earcup as shown in FIG. 12. The voice assistant/call control can be a touch control activated by a tap and performs different functions depending on the current activity. The touch control may occupy part of or the entire flat surface in the area of 1202 on the earcup. When the connected playback device is in a phone or teleconference call, a tap ends the call in progress. When a call is ringing, a tap answers the incoming call while a tap and hold rejects the incoming call. When there is no call or ringing, a tap on the voice assistant/call control activates voice recognition. In some embodiments, the touch control is held while the mic listens for a wake word. The connected mobile device's voice assistant associated with the recognized input captured by the microphone matches that voice assistant's wake word.

Communication controls also include a second voice assistant control. This control can be a physical button located on the left earcup, in some embodiments is on the rear side or rear lower corner in the area of 1208 in FIG. 12. Pressing the second voice assistant control triggers a listening period of the microphone. When input captured by the microphone matches a wake word of an available voice assistant, that voice assistant responds. In other embodiments, a press on the second voice assistant control activates a preselected voice assistant (configured via the connected mobile device or an application on the mobile device).

While specific controls, commands, and/or connections are discussed above with respect to a headphone design shown in FIGS. 7-14, one skilled in the art will recognize that the placement, location, and/or design of controls described may be applicable to other headphone designs. Additional controls, commands, and connections are discussed below with reference to a headphone design illustrated in FIGS. 15-22.

The headphone design shown in FIGS. 15-22 allows for additional control layouts that can be useful to provide an intuitive, elegant, and accessible user experience. As discussed further above, some controls may utilize touch or proximity sensors. However, others may utilize physical controls such as buttons or knobs that can be rotated by a user. Some knobs may have detents or stop points for physical feedback of the status or range of the control.

Figure 17:
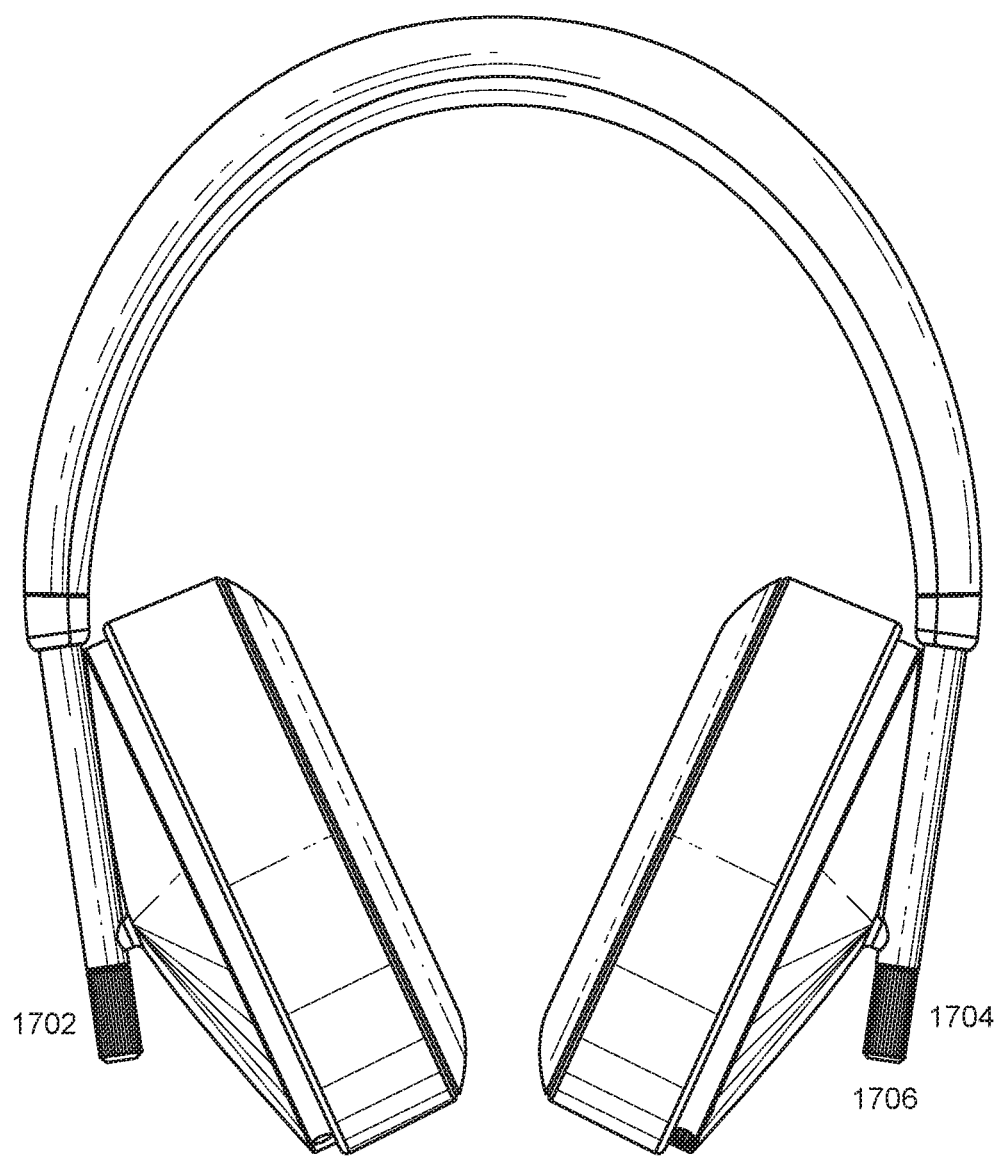
FIG. 17 illustrates a front view of a second wireless headphone design in accordance with certain embodiments of the invention.
Figure 18:
FIG. 18 illustrates a rear view of a second wireless headphone design in accordance with certain embodiments of the invention.
Figure 19:
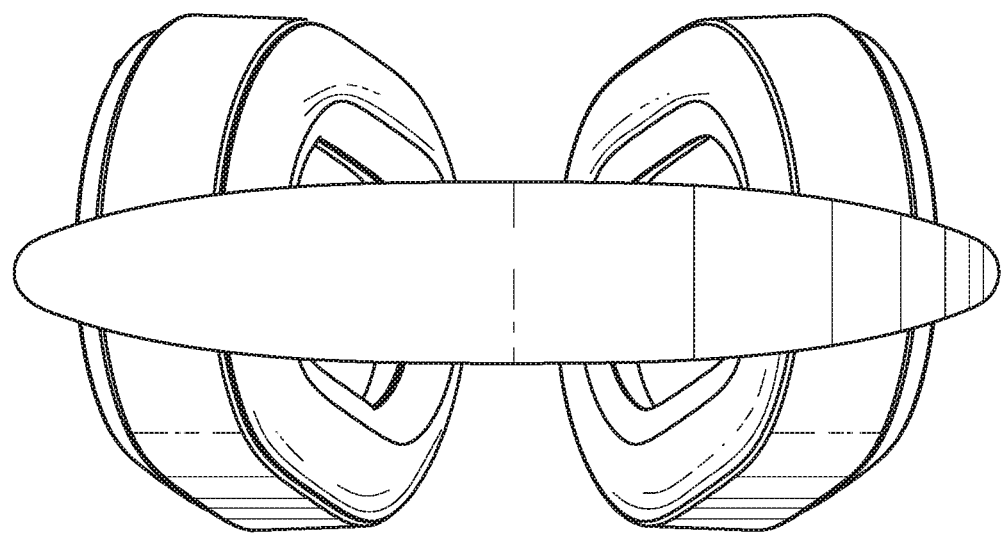
FIG. 19 illustrates a top view of a second wireless headphone design in accordance with certain embodiments of the invention.
Figure 20:
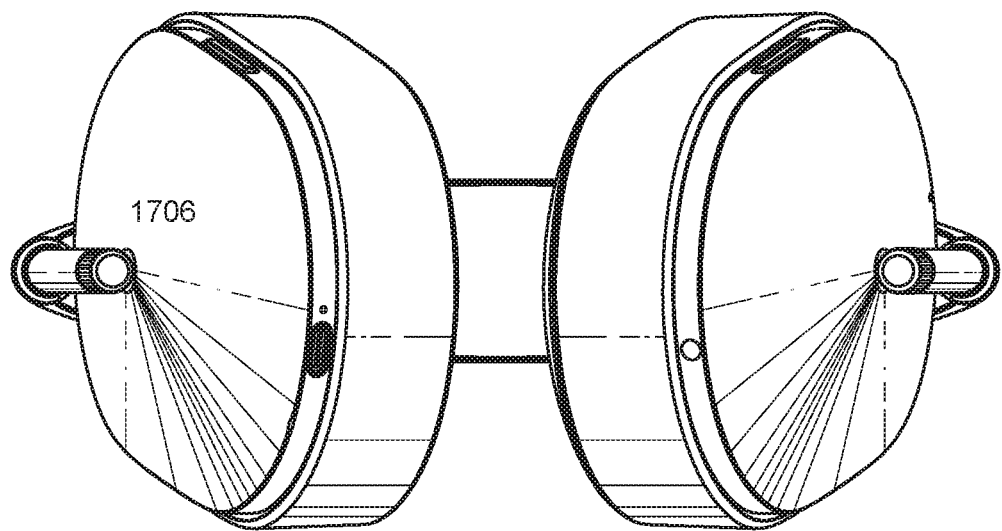
FIG. 20 illustrates a bottom view of a second wireless headphone design in accordance with certain embodiments of the invention.
Figure 21:
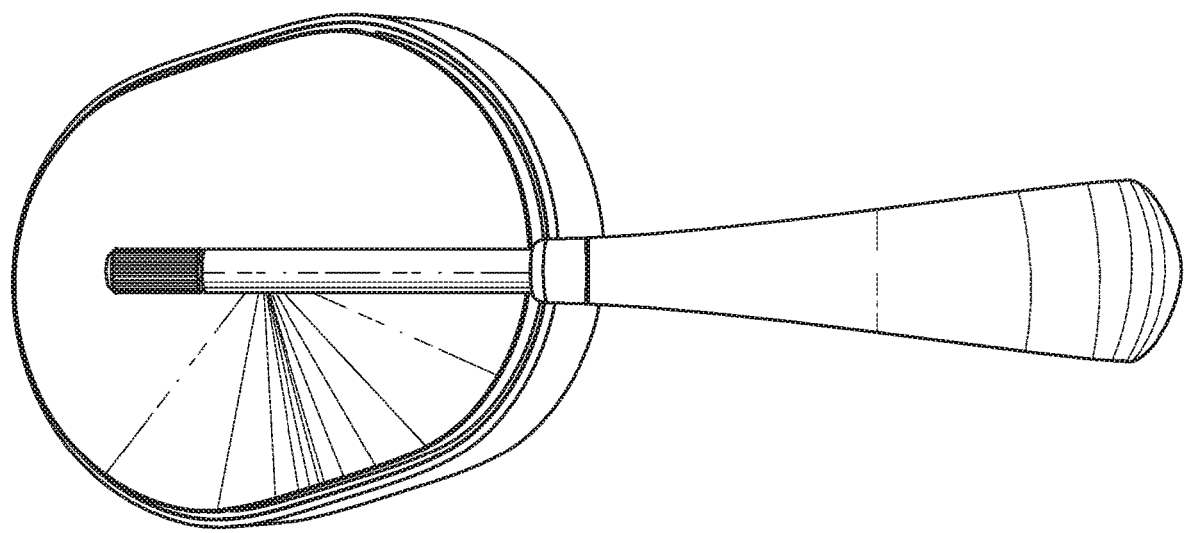
FIG. 21 illustrates a right side view of a second wireless headphone design in accordance with certain embodiments of the invention.
Figure 22:
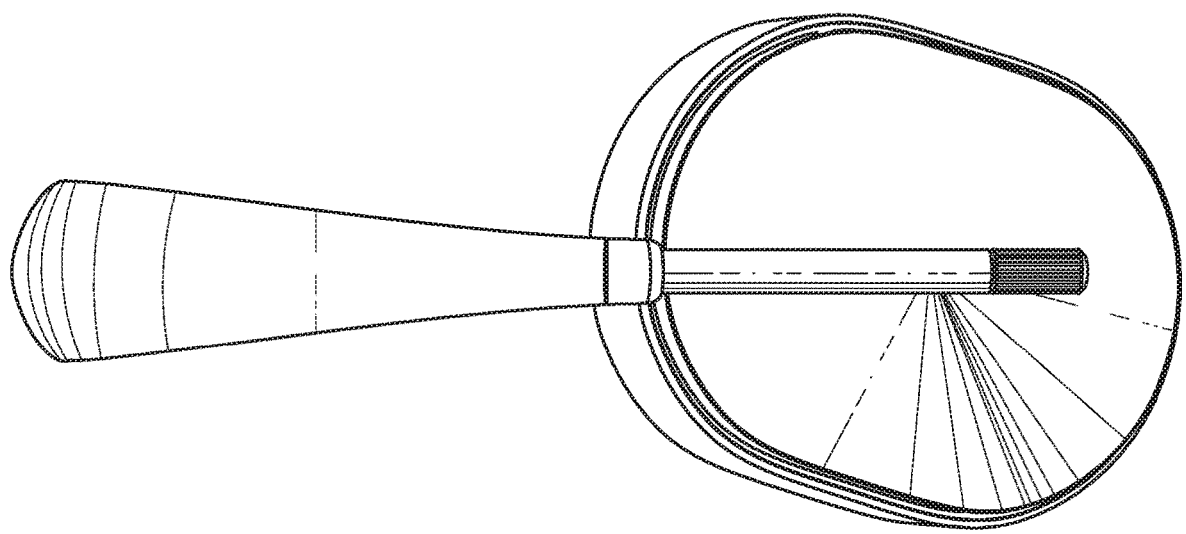
FIG. 22 illustrates a left side view of a second wireless headphone design in accordance with certain embodiments of the invention.

An ANC control and volume control as discussed further above may instead be implemented as controlled by a rotatable knob at the bottom of the headband as shown in FIG. 17. In many embodiments, the knob is on a portion of the headband that extends past the attachment point or junction where the headband meets the earcup. An ANC control can be a knob 1702 at the base of the headband that rotates to several positions (e.g., ANC on, hear-through mode, ANC and hear-through off, etc.). This can be bidirectional (e.g., stopping at each position over 360 degrees or stopping at two positions at less than 360 degrees) or unidirectional (e.g., stopping at each position). Similarly, a volume control can be a knob 1704 at the base of the headband that rotates, with or without detents, that rotates bidirectionally (e.g., stopping at each position over 360 degrees or stopping at two positions at less than 360 degrees). In several embodiments, an ANC control utilizes a knob on the left side while a volume control utilizes a knob on the right since. In other embodiments, they are switched to be on the right side and left side respectively. Knobs may be knurled (e.g., with ridges) or smooth as appropriate to a particular design and/or application.

Other controls (e.g., communication and/or content controls), status lights, and/or connections (e.g., line-in, USB-C) may be placed and/or designed on the headphone similar to embodiments discussed further above, particularly with reference to FIGS. 7-14. In several embodiments, push button controls utilize buttons such as the thin vertically elongated buttons 1802 and 1804 shown in FIG. 18. In some embodiments, a headphone with an extended portion such as illustrated in FIGS. 15-22 has a line-in port at the end surface or tip 1706 of such extended portion.

Although the controls and connectors described above are discussed with reference to FIGS. 7-22, one skilled in the art will recognize that any of a variety of wireless headphone designs (e.g., shapes and dimensions) may be utilized in accordance with embodiments of the invention as appropriate to a particular application. The controls and/or connectors may be placed in similar locations no matter the exact shape of a headphone in alternate embodiments. Further, a grouping of controls and/or connections described as being located on a left earcup or a right earcup may be on the opposite earcup instead. Similarly, a single control or connection may be on the opposite earcup as described above. Many embodiments consider design and/or usability factors in the placement on the left or right earcup, the set of which controls to group together, or the distribution of controls to different locations. For example, it may be intuitive to place the power button near the power/charge indicator and/or the charge port. It may be functionally efficient to utilize the voice assistant control also as a call control. One skilled in the art will see the descriptions above as design principles and guidance to achieving additional implementations within the scope of embodiments of the invention.

V. CONCLUSION

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A wireless headphone with user controls, the headphone comprising:
   a left earcup comprising a left speaker driver and a left earcup housing;
   and a right earcup comprising a right speaker driver and a right earcup housing;
   a processor;
   a microphone;
   a touch control surface; and
   non-volatile memory containing instructions that when executed direct the processor to:
     maintain a wireless data connection to a computing device;
     commence a voice assistant recognition routine when sound received by the microphone matches a wake word associated with one of a plurality of voice assistants, where each of the plurality of voice assistants has a different wake word, listen for a voice command after the match to a wake word, provide sound captured by the microphone after the wake word match to the corresponding voice assistant, and perform an action based on instructions returned from the voice assistant;
     update a current volume of the headphone to a higher volume when the touch control surface receives a swipe along the touch control surface in a first direction;
     update a current volume of the headphone to a lower volume when the touch control surface receives a swipe along the touch control surface in a second direction opposite of the first direction;
     skip playback of a current media content to a next media item within a playback queue of media items when the touch control surface receives a swipe along the touch control surface in third direction that is different from the first direction and the second direction;
     skip playback of the current media content to a previous media item within the playback queue of media items when the touch control surface receives a swipe along the touch control surface in a fourth direction opposite of the third direction; and
     toggle playback of the current media content between play and pause states when the touch control surface is activated by a tap.

2. The headphone of claim 1, further comprising a phone call control, where the instructions further configure the processor to answer an incoming call on the computing device when the phone call control is activated.

3. The headphone of claim 1, where the touch control surface comprises a series of proximity sensors.

4. The headphone of claim 1, where the touch control surface is on the right earcup.

5. The headphone of claim 1, where the computing device is a mobile device.

6. The headphone of claim 1 further comprising a voice assistant activator control; and where the instructions direct the processor to process sound received by the microphone when the voice assistant activator control is actuated.

7. The headphone of claim 1, wherein the instructions direct the processor to play an indicator sound at the current volume when the current volume is updated.

8. The headphone of claim 1, where the current media content is received by the headphone from a media content source.

9. The method of claim 1, further comprising receiving the current media content by the headphone from a media content source.

10. A method of controlling a wireless headphone with user controls, the method comprising:

maintaining a wireless data connection from a wireless headphone to a computing device, where the wireless headphone comprises:

a left earcup comprising a left speaker driver and a left earcup housing;

and a right earcup comprising a right speaker driver and a right earcup housing;

a processor;

a microphone; and a touch control surface;

commencing, by the wireless headphone, a voice assistant recognition routine when sound received by the microphone matches a wake word associated with one of a plurality of voice assistants, where each of the plurality of voice assistants has a different wake word, listening for a voice command after the match to a wake word, providing sound captured by the microphone after the wake word match to the corresponding voice assistant, and performing an action based on instructions returned from the voice assistant;

updating, by the wireless headphone, a current volume of the headphone to a higher volume when the touch control surface receives a swipe along the touch control surface in a first direction;

updating, by the wireless headphone, a current volume of the headphone to a lower volume when the touch control surface receives a swipe along the touch control surface in a second direction opposite of the first direction;

skipping, by the wireless headphone, playback of a current media content to a previous media item within a playback queue of media items when the touch control surface receives a swipe along the touch control surface in a third direction that is different from the first direction and the second direction;

skipping, by the wireless headphone, playback of the current media content to a previous media item within the playback queue of media items when the touch control surface receives a swipe along the touch control surface in a fourth direction opposite of the third direction; and toggling, by the wireless headphone, playback of the current media content between play and pause states when the touch control surface is activated by a tap.

11. The method of claim 10, further comprising answering an incoming call on the computing device when a phone call control is activated.

12. The method of claim 10, wherein the touch control surface comprises a series of proximity sensors.

13. The method of claim 10, where the touch control surface is on the right earcup.

14. The method of claim 10, where the computing device is a mobile device.

15. The method of claim 10 further comprising processing sound received by the microphone when a voice assistant activator control is actuated.

16. The method of claim 10 further comprising playing an indicator sound at the current volume when the current volume is updated.

17. The headphone of claim 1, wherein the touch control surface comprises one or more sensors that can detect touch at multiple locations on the surface.

18. The headphone of claim 17, wherein a swipe along the touch control surface comprises a swipe from a first location on the touch control surface to a second location on the touch control surface.

19. The method of claim 10, wherein the touch control surface comprises one or more sensors that can detect touch at multiple locations on the surface.

20. The method of claim 19, wherein a swipe along the touch control surface comprises a swipe from a first location on the touch control surface to a second location on the touch control surface.

* * * * *